(12) United States Patent
Lee et al.

(10) Patent No.: US 11,943,659 B2
(45) Date of Patent: Mar. 26, 2024

(54) METHOD AND TERMINAL FOR ACCESSING ACCESS POINT IN WIRELESS COMMUNICATION SYSTEM

(71) Applicants: Samsung Electronics Co., Ltd., Gyeonggi-do (KR); Seoul National University R&DB Foundation, Seoul (KR)

(72) Inventors: Mingyu Lee, Gyeonggi-do (KR); Hyunseob Oh, Seoul (KR); Whasook Jeon, Seoul (KR)

(73) Assignees: Samsung Electronics Co., Ltd (KR); Seoul National University R&DB Foundation (KR)

( * ) Notice: Subject to any disclaimer, the term of this patent is extended or adjusted under 35 U.S.C. 154(b) by 182 days.

(21) Appl. No.: 16/979,709

(22) PCT Filed: Jun. 19, 2019

(86) PCT No.: PCT/KR2019/007411
§ 371 (c)(1),
(2) Date: Sep. 10, 2020

(87) PCT Pub. No.: WO2020/004862
PCT Pub. Date: Jan. 2, 2020

(65) Prior Publication Data
US 2021/0045012 A1    Feb. 11, 2021

(30) Foreign Application Priority Data
Jun. 27, 2018    (KR) .................. 10-2018-0074183

(51) Int. Cl.
*H04W 28/082*    (2023.01)
*H04B 17/318*    (2015.01)
(Continued)

(52) U.S. Cl.
CPC ........ *H04W 28/082* (2023.05); *H04B 17/318* (2015.01); *H04B 17/336* (2015.01); *H04W 24/10* (2013.01)

(58) Field of Classification Search
CPC ........... H04W 28/085; H04W 28/0236; H04W 28/0942; H04W 28/0226; H04W 28/08;
(Continued)

(56) References Cited

U.S. PATENT DOCUMENTS

| 8,958,296 B2 | 2/2015 | Koo et al. |
| 9,439,136 B2 | 9/2016 | Park et al. |

(Continued)

FOREIGN PATENT DOCUMENTS

| KR | 1020110128147 | 11/2011 |
| KR | 1020150056990 | 5/2015 |

(Continued)

OTHER PUBLICATIONS

Arunesh Mishra et al., "Partially Overlapped Channels Not Considered Harmful", in Proc ACM SIG Metrics/Performance 06, Jun. 26-30, 2006, 12 pages.

(Continued)

*Primary Examiner* — Un C Cho
*Assistant Examiner* — Rasha K Fayed
(74) *Attorney, Agent, or Firm* — The Farrell Law Firm, P.C.

(57) ABSTRACT

Provided are a terminal and a method of accessing an access point (AP) by the terminal, in a wireless communication system. The method includes determining whether to maintain access to a currently accessed radio channel, based on load information of a currently accessed AP, determining a radio channel to be accessed, based on the load information of the AP near the terminal and channel interference information, and accessing the determined radio channel.

16 Claims, 12 Drawing Sheets

(51) Int. Cl.
*H04B 17/336* (2015.01)
*H04W 24/10* (2009.01)

(58) Field of Classification Search
CPC ..... H04W 24/10; H04W 24/08; H04W 48/20;
H04W 48/16; H04W 48/06; H04W 48/14;
H04W 48/10; H04W 48/12; H04W 48/00;
H04W 72/082; H04W 72/08; H04W
72/0406; H04W 72/0486; H04W 72/10;
H04W 72/0446; H04W 16/14; H04W
16/30; H04W 16/28; H04W 40/244;
H04W 88/08; H04W 88/00; H04W 88/06;
H04W 88/02; H04W 88/10; H04W 84/12;
H04W 84/02; H04W 52/0216; H04W
52/0229; H04W 52/283; H04W 52/50;
H04W 80/10; H04W 80/12; H04W 8/005;
H04W 12/062; H04W 12/06; H04W
12/08; H04W 76/11; H04W 76/15; H04W
76/19; H04W 76/30; H04W 74/08; H04L
43/12; H04L 43/0876; H04L 43/16; H04L
41/0803; H04B 17/318; H04B 17/336;
H04B 17/345; Y02D 30/70
See application file for complete search history.

(56) References Cited

U.S. PATENT DOCUMENTS

| | | | |
|---|---|---|---|
| 9,609,580 B2 | 3/2017 | Park et al. | |
| 9,826,473 B2 | 11/2017 | Lee et al. | |
| 10,555,186 B2 | 2/2020 | Jeong et al. | |
| 2004/0047312 A1* | 3/2004 | Muszynski | H04W 36/30 370/331 |
| 2006/0160550 A1* | 7/2006 | Edwards | H04W 72/541 455/509 |
| 2011/0028163 A1* | 2/2011 | Hoshihara | H04W 72/02 455/456.1 |
| 2011/0201367 A1* | 8/2011 | Aminaka | H04W 16/04 455/507 |
| 2011/0292897 A1* | 12/2011 | Wu | H04W 72/0486 370/329 |
| 2011/0299479 A1* | 12/2011 | Deb | H04W 28/18 370/329 |
| 2013/0058310 A1* | 3/2013 | Park | H04W 72/082 370/329 |
| 2014/0226756 A1* | 8/2014 | Menkhoff | H04L 27/20 375/302 |
| 2014/0235167 A1* | 8/2014 | Jung | H04W 8/005 455/41.2 |
| 2014/0323131 A1* | 10/2014 | Yun | H04W 76/15 455/436 |
| 2014/0328193 A1* | 11/2014 | Horn | H04W 24/10 370/252 |
| 2015/0065157 A1* | 3/2015 | Homchaudhuri | H04W 72/082 455/452.1 |
| 2015/0065189 A1* | 3/2015 | Zhou | H04W 52/245 455/522 |
| 2015/0119059 A1* | 4/2015 | Miao | H04W 16/14 455/452.1 |
| 2015/0181507 A1* | 6/2015 | Park | H04W 72/0446 370/336 |
| 2015/0304889 A1* | 10/2015 | Qian | H04W 72/569 370/235 |
| 2015/0350974 A1* | 12/2015 | Patil | H04W 36/00835 370/331 |
| 2015/0351026 A1* | 12/2015 | Lee | H04W 72/10 370/237 |
| 2016/0088444 A1* | 3/2016 | David | H04W 4/029 455/456.1 |
| 2016/0227416 A1* | 8/2016 | Suzuki | H04W 74/004 |
| 2017/0026970 A1* | 1/2017 | Pack | H04W 72/0426 |
| 2017/0048715 A1* | 2/2017 | Fan | H04L 45/507 |
| 2017/0048763 A1* | 2/2017 | Ke | H04W 36/0066 |
| 2017/0086076 A1* | 3/2017 | Sadek | H04W 76/28 |
| 2017/0201952 A1* | 7/2017 | Ahmed | H04W 52/244 |
| 2017/0215140 A1* | 7/2017 | Stupar | H04W 48/20 |
| 2018/0042022 A1* | 2/2018 | Tsao | H04W 72/042 |
| 2018/0242169 A1* | 8/2018 | Kowal | H04W 24/02 |
| 2018/0295528 A1* | 10/2018 | Anantha | H04W 24/08 |
| 2018/0376275 A1* | 12/2018 | Jiang | H01Q 3/36 |
| 2019/0200366 A1* | 6/2019 | Park | H04W 72/085 |
| 2019/0239124 A1* | 8/2019 | Gacanin | H04W 28/18 |
| 2019/0246349 A1* | 8/2019 | Xing | H04W 48/16 |

FOREIGN PATENT DOCUMENTS

| | | |
|---|---|---|
| KR | 1020150136406 | 12/2015 |
| KR | 1020160141816 | 12/2016 |
| WO | WO 2014/010957 | 1/2014 |
| WO | WO 2014/092468 | 6/2014 |

OTHER PUBLICATIONS

M. H. Dwijaksara et al., "A Joint User Association and Load Balancing Scheme for Wireless LANs Supporting Multicast Transmission", in Proc. 31th ACM SAC, Apr. 4-8, 2016, 8pgs.
International Search Report dated Oct. 4, 2019 issued in counterpart application No. PCT/KR2019/007411, 17 pages.
Korean Office Action dated Mar. 31, 2022 issued in counterpart application No. 10-2018-0074183, 8 pages.

* cited by examiner start_of_text|># METHOD AND TERMINAL FOR ACCESSING ACCESS POINT IN WIRELESS COMMUNICATION SYSTEM

PRIORITY

This application is a National Phase Entry of PCT International Application No. PCT/KR2019/007411 which was filed on Jun. 19, 2019, and claims priority to Korean Patent Application No. 10-2018-0074183, which was filed on Jun. 27, 2018, the content of each of which is incorporated herein by reference.

TECHNICAL FIELD

The disclosure relates to a wireless communication system, and for example, to a method and terminal for accessing an access point (AP). More specifically, the disclosure relates to a terminal and a method in which the terminal or a user equipment (UE) accesses an AP such that a load of a network is distributed based on a channel load amount for each frequency band of the AP and inter-channel interference information of the AP in an environment where a plurality of wireless local area network (LAN) APs are mixed together.

BACKGROUND ART

Along with the development of information and communication technology, various wireless communication techniques have been developed. Among these techniques, a wireless local area network (LAN) is a technique that allows wireless access to the Internet by using a portable terminal such as a personal digital assistant (PDA), a laptop computer, a portable multimedia player (PMP), a mobile terminal, etc., based on a radio frequency technique in a particular service providing area like a home, a company, an aircraft, etc.

In a wireless LAN system, a terminal or a user equipment (UE) performs an AP scanning process to search for an accessible AP. The AP scanning process is a process in which the UE obtains a list of candidate APs that may be coupled with the terminal and information about each AP so as to become a member of a particular extended service set (ESS).

DESCRIPTION OF EMBODIMENTS

Solution to Problem

Provided are a method and a terminal capable of improving performance of a network in a wireless communication system.

BEST MODE

Figure 1:
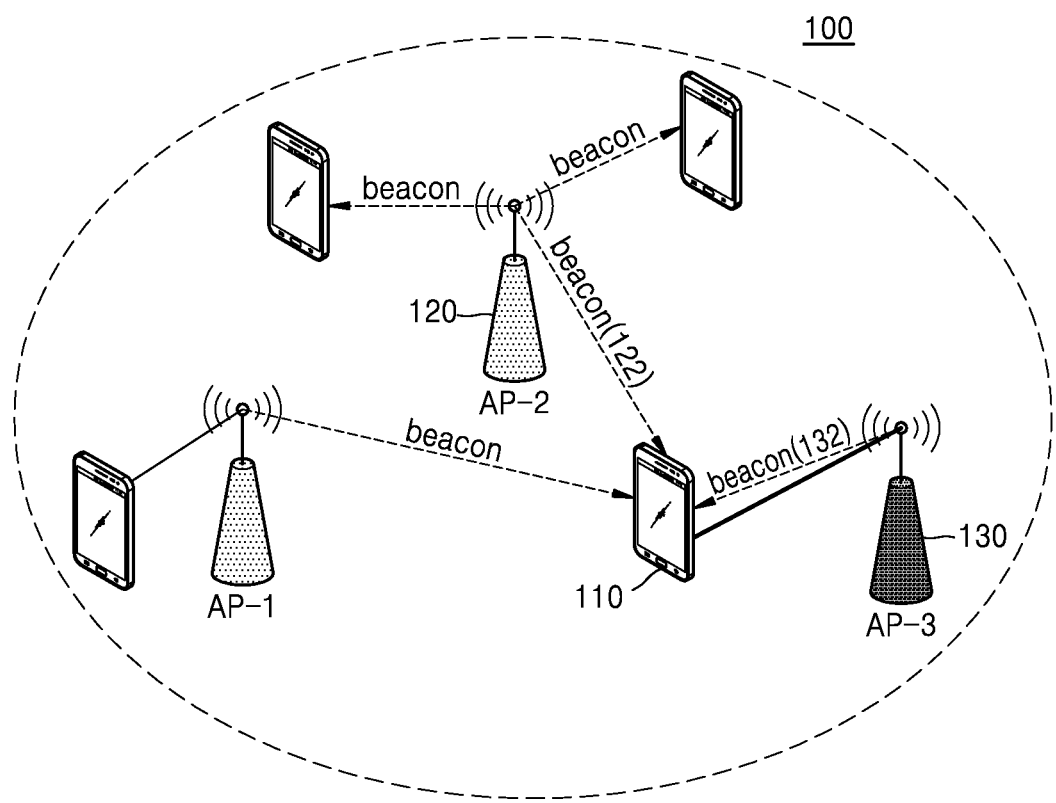
FIG. 1 is a view for describing a method, performed by a terminal, of accessing a radio channel by using a distributed user association (UA) scheme, according to an embodiment of the disclosure.

According to an embodiment of the disclosure, a method, performed by a terminal, of accessing an access point (AP) in a wireless communication system includes receiving a beacon frame including load information of a currently accessed AP, determining whether to maintain access to a currently accessed radio channel, based on the load information of the currently accessed AP, receiving a beacon frame including load information of an AP near the terminal by scanning the AP near the terminal, when determining not to maintain the access to the currently accessed radio channel, determining a radio channel to be accessed, based on the load information of the AP near the terminal and inter-channel interference information, and accessing the determined radio channel.

According to an embodiment of the disclosure, the load information of the AP may include basic service set (BSS) load information including a number of accessed terminals for each frequency band of the AP, a channel load quantity for each frequency band of the AP, and an average spectral efficiency of the AP.

According to an embodiment of the disclosure, the determining of the radio channel to be accessed may include determining an AP to be accessed, a frequency band to be used, and a channel number to be used.

According to an embodiment of the disclosure, the determining of whether to maintain the access to the currently accessed radio channel may include determining whether to maintain the access to the currently accessed radio channel based on a number of terminals accessing a currently accessed band of the currently accessed AP, when a channel load quantity of the currently accessed radio channel is greater than or equal to a threshold value.

According to an embodiment of the disclosure, the inter-channel interference information may include where inter-channel interference of the AP near the terminal occurs, and the determining of the radio channel to be accessed based on the load information of the AP near the terminal and the inter-channel interference information may include measuring a received signal strength indicator (RSSI) of a signal received from the AP near the terminal and determining whether inter-channel interference of the AP near the terminal occurs, based on the RSSI of the signal received from the AP near the terminal and an adjacent channel power leakage ratio.

According to an embodiment of the disclosure, the inter-channel interference information may include whether inter-channel interference of the AP near the terminal occurs, and the determining of the radio channel to be accessed based on the load information of the AP near the terminal and the inter-channel interference information may include measuring the RSSI of the signal received from the AP near the terminal, determining whether inter-channel interference of the AP near the terminal occurs, based on the RSSI of the signal received from the AP near the terminal and the adjacent channel power leakage ratio, obtaining a sum of channel load quantities of channels interfering with the radio channel with respect to the terminal's access to the radio channel, based on whether the inter-channel interference of the AP near the terminal occurs, obtaining a weight value based on the sum of the channel load quantities and a channel load quantity of the radio channel with respect to the terminal's access to the radio channel, obtaining an expected value of an average spectral efficiency of the radio channel with respect to the terminal's access to the radio channel, based on an average spectral efficiency of the radio channel, obtaining a resource efficiency with respect to the terminal's access to the radio channel, based on the weight value and the expected value of the average spectral efficiency, and determining the radio channel to be accessed, based on the resource efficiency.

According to an embodiment of the disclosure, the method may further include receiving a beacon frame including the load information of the AP near the terminal by periodically scanning the AP near the terminal, measuring the RSSI of the signal received from the AP near the terminal, transmitting the beacon frame including the load information of the AP near the terminal and the RSSI of the signal received from the AP near the terminal to a centralized AP that is controlled by a central controller, and receiving an access determination result from the centralized AP and accessing the radio channel to which the access of the terminal is determined, based on the access determination result.

According to an embodiment of the disclosure, the access determination result may include a result obtained in a way that the central controller determines a total resource efficiency of a network based on the beacon frame of the AP near the terminal, a transmission speed and traffic information for each of terminals accessing the centralized AP, and an RSSI of an AP near the centralized AP, and determines a radio channel to be accessed for each terminal based on the determined total resource efficiency of the network, in which the total resource efficiency, the transmission speed and the traffic information for each terminal, and the RSSI are received by the central controller from the centralized AP.

According to an embodiment of the disclosure, the total resource efficiency of the network may be determined in a way that the central controller determines whether inter-channel interference occurs between APs near the centralized AP occurs based on the RSSI of the AP near the centralized AP and an adjacent channel power leakage ratio and determines the total resource efficiency of the network based on whether inter-channel interference occurs between the APs near the centralized AP.

According to another embodiment of the disclosure, a terminal accessing an AP in a wireless communication system may include a communicator configured to communicate with a plurality of APs, a memory storing one or more instructions, and at least one processor configured to execute the one or more instructions to receive a beacon frame including load information of a currently accessed AP, determine whether to maintain an access to a currently accessed radio channel, based on the load information of the currently accessed AP, receive a beacon frame including load information of an AP near the terminal by scanning the AP near the terminal, when determining not to maintain the access to the currently accessed radio channel, determine a radio channel to be accessed based on load information of the AP near the terminal and inter-channel interference information, and access the determined radio channel.

According to another embodiment of the disclosure, a computer program product includes a recording medium having stored therein a program for causing a terminal to perform operations of receiving a beacon frame including load information of a currently accessed AP, determining whether to maintain an access to a currently accessed radio channel, based on the load information of the currently accessed AP, receiving a beacon frame including load information of an AP near the terminal by scanning the AP near the terminal, when determining not to maintain the access to the currently accessed radio channel, determining a radio channel to be accessed based on load information of the AP near the terminal and inter-channel interference information, and accessing the determined radio channel.

Mode of Disclosure

Hereinafter, embodiments of the disclosure will be described in detail with reference to the accompanying drawings.

When the embodiments of the disclosure are described, technical matters that are well known in a technical field of the disclosure and are not directly related to the disclosure will not be described. By omitting an unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to using an identical reference numeral.

Advantages and features of the disclosure and a method of achieving them will be apparent with reference to embodiments of the disclosure described below together with the attached drawings. However, the disclosure is not limited to the disclosed embodiments of the disclosure, but may be implemented in various manners, and the embodiments of the disclosure are provided to complete the disclosure of the disclosure and to allow those of ordinary skill in the art to understand the scope of the disclosure. The disclosure is defined by the category of the claims. Throughout the specification, an identical reference numeral will indicate an identical element.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of order. For example, two blocks shown in succession may, in fact, be executed substantially concurrently or the blocks may sometimes be executed in the reverse order, depending on the functionality involved.

In the current embodiment of the disclosure, the term '~unit', as used herein, denotes a software or hardware component, such as a Field Programmable Gate Array (FPGA) or Application Specific Integrated Circuit (ASIC), which performs certain tasks. However, the meaning of '~unit' is not limited to software or hardware. "Unit" may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~units' may be combined into fewer components and '~units' or further separated into additional components and '~units'. In addition, components and 'unit(s)' may be implemented to execute one or more CPUs in a device or a secure multimedia card. In the embodiments of the disclosure, '~unit' may include one or more processors.

The terms as used herein are defined considering the functions in the disclosure and may be replaced with other terms according to the intention or practice of the user or operator. Therefore, the terms should be defined based on the overall disclosure. While embodiments of the disclosure are described by using a wireless local area network (WLAN) system as an example, the embodiments of the disclosure may also be applied to other communication systems having a similar technical background or channel form. The embodiments of the disclosure may also be applied to other communication systems through some modifications within a range that does not largely depart from the scope of the disclosure based on determination by a person of ordinary skill in the art.

In the disclosure, the term "terminal" may be interchangeably used with a user or a STA (station). The term "access" may also be interchangeably used with association. For example, user association (UA) may be understood as terminal access.

In the disclosure, an access point (AP) may mean a WLAN AP.

In the disclosure, a centralized AP (or a controller-based AP) may mean an AP controlled by a central controller.

In the disclosure, a stand-alone AP (or an autonomous AP or a non-central-controller-based AP) may mean an AP that is not controlled by the central controller. In the disclosure, the AP may be any one of a centralized AP or a stand-alone AP, unless described specially.

In the disclosure, the AP may be a dual-band WLAN AP that supports both a frequency band of 2.4 GHz and a frequency band of 5 GHz. Each AP is allocated a use channel for each band. The AP may transmit a beacon frame including load information of the AP.

In the disclosure, determination of a radio channel to be accessed may mean determination of an AP to be accessed, a frequency band to be used, and a channel number to be used.

In the disclosure, a central controller may mean a controller that obtains information including the number of terminals accessing an AP, traffic information for each terminal, and a transmission speed from the centralized AP through wired communication (e.g., Ethernet). For example, the central controller may be referred to as a WLAN controller. The stand-alone AP operates independently of the central controller, and thus the central controller may not be able to directly obtain information associated with the stand-alone AP from the stand-alone AP.

In the disclosure, the distributed UA scheme may mean a UA scheme in which a terminal determines an AP which the terminal is to access in a wireless communication system.

In the disclosure, the centralized UA scheme may mean a UA scheme in which the central controller determines an AP which each terminal in a network is to access based on a WLAN condition in a wireless communication system.

FIG. 1 is a view for describing a method, performed by a terminal, of accessing a radio channel based on a distributed UA scheme, according to an embodiment of the disclosure.

Referring to FIG. 1, a terminal 110 according to an embodiment of the disclosure currently accesses an AP-2 120. The terminal 110 may receive a beacon frame 122 including load information of the AP-2 120 from the AP-2 120. The terminal 110 may determine whether to maintain access to a currently accessed radio channel, based on the load information of the currently accessed AP-2 120. This will be described in more detail with reference to FIG. 4.

When the terminal 110 determines not to maintain the access to the currently accessed radio channel, the terminal 110 may receive a beacon frame including load information of an AP near the terminal 110 by scanning any AP near the terminal 110.

The terminal 110 may determine and access a radio channel based on the received load information of the AP near the terminal 110 and channel interference information. This will be described in more detail with reference to FIG. 6.

Figure 2:
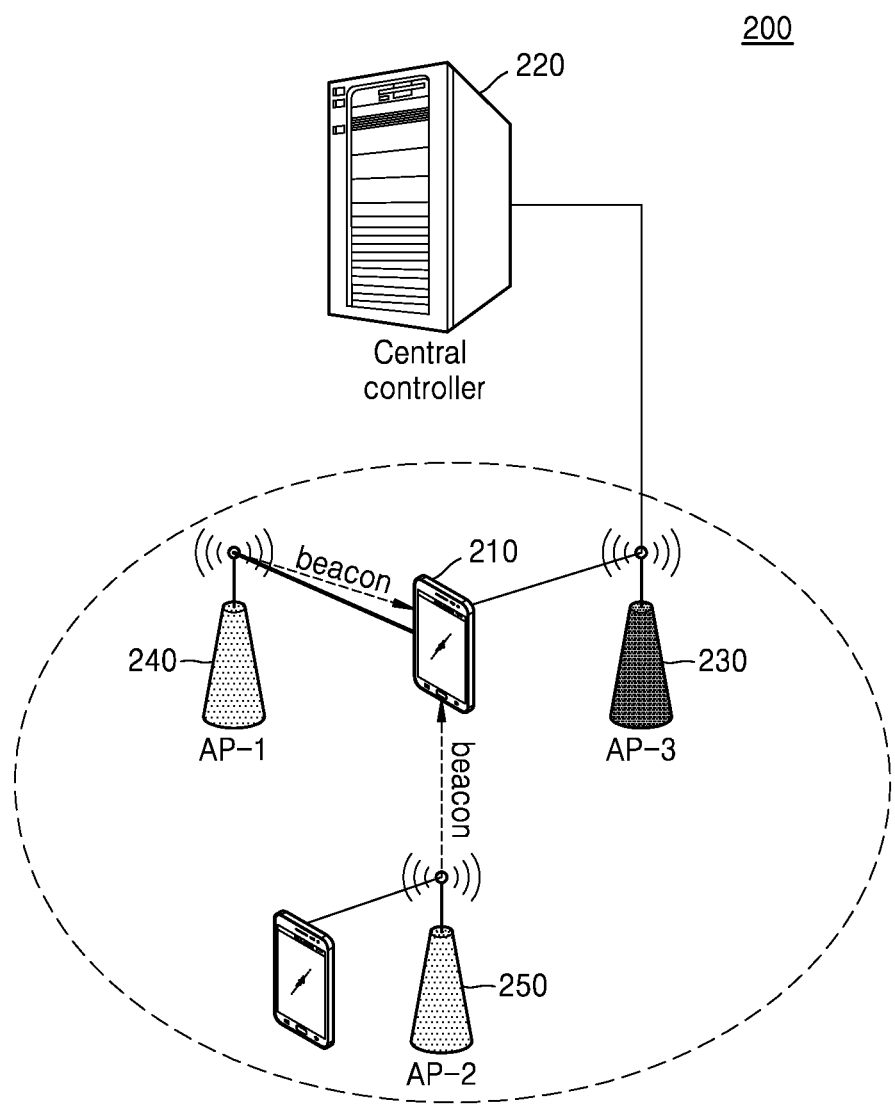
FIG. 2 is a view for describing a method, performed by a terminal, of accessing a radio channel by using a centralized UA scheme, according to an embodiment of the disclosure.

FIG. 2 is a view for describing a method, performed by a terminal, of accessing a radio channel by using a centralized UA scheme, according to an embodiment of the disclosure.

Referring to FIG. 2, each AP may transmit a beacon frame including load information of the AP. A terminal 210 currently accesses an AP-3 230.

The terminal 210 may receive a beacon frame including load information of an AP near the terminal 210 by periodically scanning any AP near the terminal 210. The terminal 210 may also receive a beacon frame including load information of an AP near the terminal 210 by aperiodically scanning any AP near the terminal 210. In FIG. 2, the terminal 210 may receive a beacon frame including load information of each AP from each of APs near the terminal 210, e.g., an AP-1 240, an AP-2 250, and an AP-3 230.

The terminal 210 may transmit the received beacon frame including the load information of the AP to the centralized AP, the AP-3 230.

The terminal 210 may then receive an access determination result from the centralized AP, the AP-3 230, and access a radio channel to which access of the terminal 210 is determined, based on the access determination result. The access determination result may be determined by the central controller 220. This will be described in more detail with reference to FIG. 10.

Figure 3:
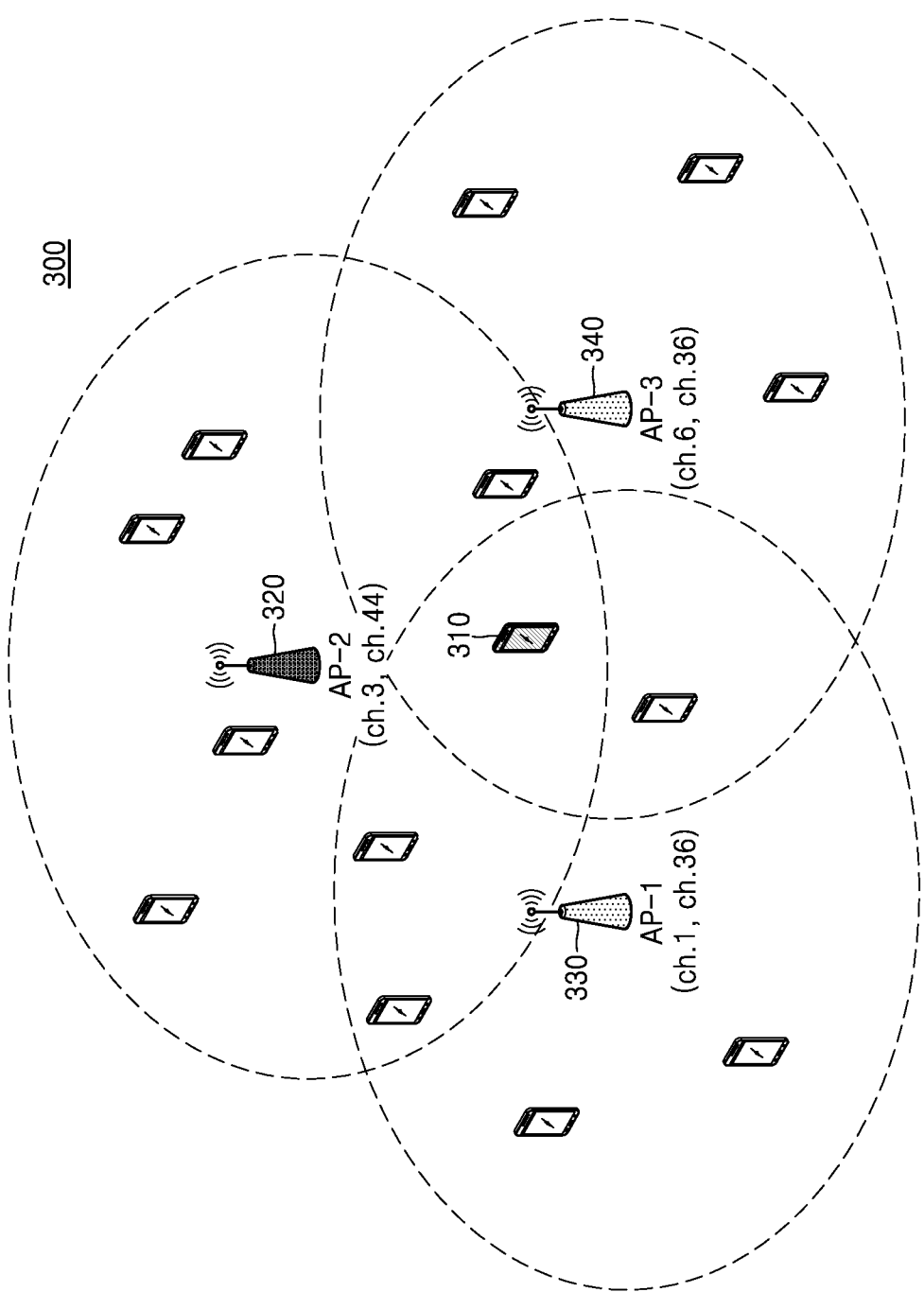
FIG. 3 illustrates a wireless LAN environment in which a method, performed by a terminal, of accessing a radio channel is executed, according to an embodiment of the disclosure.

FIG. 3 illustrates a wireless LAN environment in which a method of accessing a radio channel is executed by a terminal, according to an embodiment of the disclosure.

Referring to FIG. 3, an environment where a method, according to an embodiment of the disclosure, is executed may include at least one stand-alone AP and at least one centralized AR In FIG. 3, an AP-1 330 and an AP-3 340 are stand-alone APs, and an AP-2 320 is a centralized AP.

In an AP-dense situation, APs often use the same channel or overlapping channels, such that the APs share channels with each other. Thus, load distribution is required for network quality improvement.

In a case where the AP is a dual-band WLAN AP that supports both the frequency band of 2.4 GHz and the frequency band of 5 GHz, load imbalance between bands may occur, requiring load distribution between bands through band steering that moves the accessing terminal between the bands.

In a case where the centralized AP and the stand-alone AP are mixed, load imbalance may occur between the centralized AP and the stand-alone AP.

According to the disclosed method, in an environment where two types of APs, i.e., stand-alone APs and centralized APs, are densely mixed, network load distribution may be efficiently performed.

Figure 4:
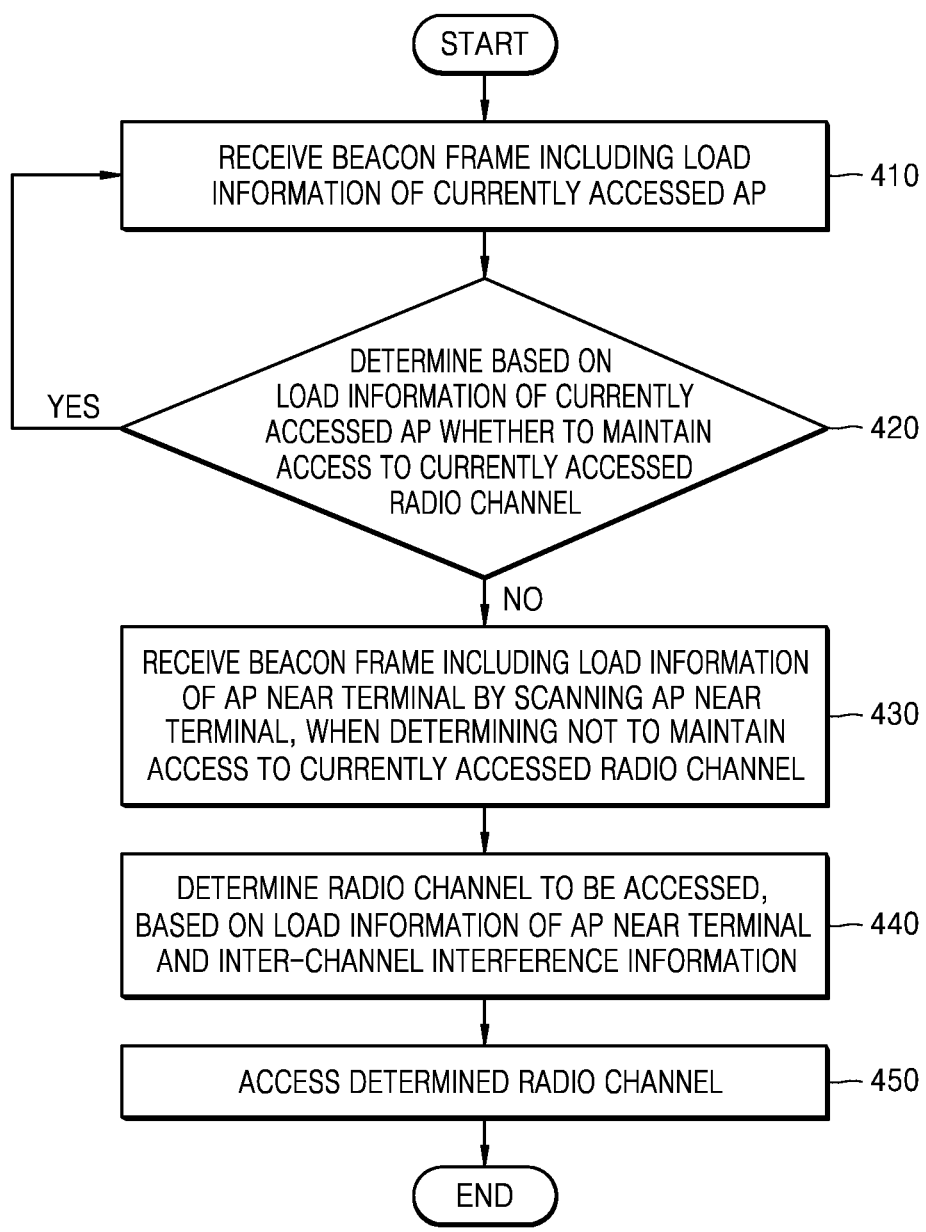
FIG. 4 is a flowchart illustrating a method, performed by a terminal, of accessing a radio channel by using a distributed UA scheme, according to an embodiment of the disclosure.

FIG. 4 is a flowchart illustrating a method, performed by a terminal, of accessing a radio channel by using a distributed UA scheme, according to an embodiment of the disclosure.

In operation 410, a terminal may receive from a currently accessed AP; a beacon frame including load information of the AP. According to an embodiment of the disclosure, the load information of the AP may include basic service set (BSS) load information. The BSS load information may include the number of accessed terminals for each frequency band of the AP, |S(k,B)|, a channel load quantity for each frequency band of the AP, L(k,B), and an average spectral efficiency (SE) of the AP, Γ(k,B). Herein, S(k,B) may mean a set of terminals accessing a band B of an AP-k (B∈{2.4 GHz}) and L(k,B) may mean a channel load quantity in the frequency band B of the AP-k. L(k,B) may be defined as follows:

$$L(k, B) = \sum_{i \in S(k,B)} \frac{\alpha_{k,i}}{C_{k,i}} \quad \text{[Equation 1]}$$

Herein, $\alpha_{k,i}$ may mean a traffic arrival rate of an STA-i associated with the AP-k, $C_{k,i}$ may mean a transmission speed of a link between the AP-k and the STA-i, and S(k,B) may mean a set of terminals accessing the band B of the AP-k B∈{2.4 GHz, 5 GHz}, as described above.

Γ(k,B) may be defined as follows:

$$\Gamma(k, B) = \frac{|S(k, B)|}{\sum_{i \in S(k,B)} \frac{1}{f(SNR_{k,i})}} \quad \text{[Equation 2]}$$

Herein, |S(k,B)| may mean the number of accessed terminals for each frequency band of an AP as described above, and $f(SNR_{k,i})$ may mean an SE between the AP-k and the STA-i. This may be defined as follows:

$$f(SNR_{k,i}) = \min(2.7, \log_2(1+0.25 \cdot SNR_{k,i})) \quad \text{[Equation 3]}$$

Herein, $SNR_{k,i}$ may mean a signal-to-noise ratio (SNR) between the AP-k and the STA-i.

In operation 420, the terminal may determine whether to maintain access to a currently accessed radio channel, based on the load information of the currently accessed AP. According to an embodiment of the disclosure, when a channel load quantity, L(k,B), of a currently accessed frequency band of a currently accessed AP is greater than or equal to a threshold value $L_{th}$, the terminal may determine whether to maintain access to the currently accessed radio channel, based on the number of terminals accessing a currently accessed band of the currently accessed AP. According to an embodiment of the disclosure, the terminal may determine not to maintain access to the currently accessed radio channel based on a probability $$\frac{1}{|S(k, B)|}$$

of a reciprocal of the number |S(k,B)| of terminals accessing the currently accessed band of the currently accessed AP.

In operation 430, when the terminal determines not to maintain the access to the currently accessed radio channel in operation 420, the terminal may scan an AP near the terminal and receive a beacon frame including load information of the AP near the terminal.

In operation 440, the terminal may determine a radio channel to be accessed, based on the received load information of the AP near the terminal and channel interference information. This will be described in more detail with reference to FIG. 6.

In operation 450, the terminal may access the radio channel determined in operation 440.

Figure 5:
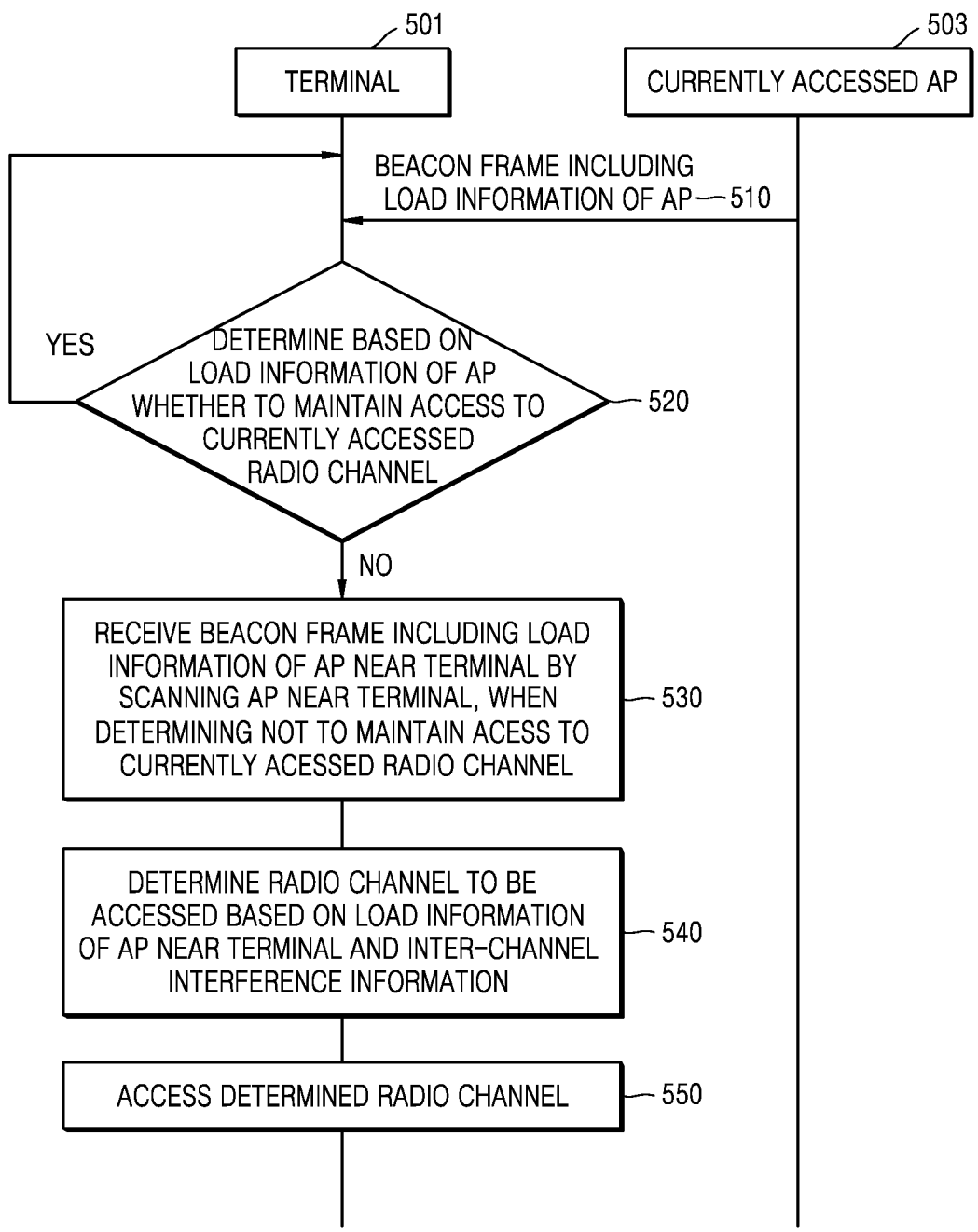
FIG. 5 is a view for describing a method, performed by a terminal, of accessing a radio channel by using a distributed UA scheme, according to an embodiment of the disclosure.

FIG. 5 is a view for describing a method, performed by a terminal, of accessing a radio channel by using a distributed UA scheme, according to an embodiment of the disclosure.

Referring to FIG. 5, in operation 510, an AP 503 that a terminal 501 currently accesses may transmit a beacon frame including load information of the currently accessed AP 503, and the terminal 501 may receive the beacon frame.

Operations 520 through 550 of FIG. 5 are the same as operations 420 through 450 of FIG. 4, and thus will be described in brief. In operation 520, the terminal 501 may determine whether to maintain access to a currently accessed radio channel, based on load information of the currently accessed AP 503. In operation 530, when the terminal 501 determines not to maintain the access to the currently accessed radio channel, the terminal 501 may scan an AP near the terminal 501 and receive a beacon frame including load information of the AP near the terminal 501. In operation 540, the terminal 501 may determine a radio channel to be accessed, based on the received load information of the AP near the terminal 501 and channel interference information. In operation 550, the terminal 501 may access the determined radio channel.

Figure 6:
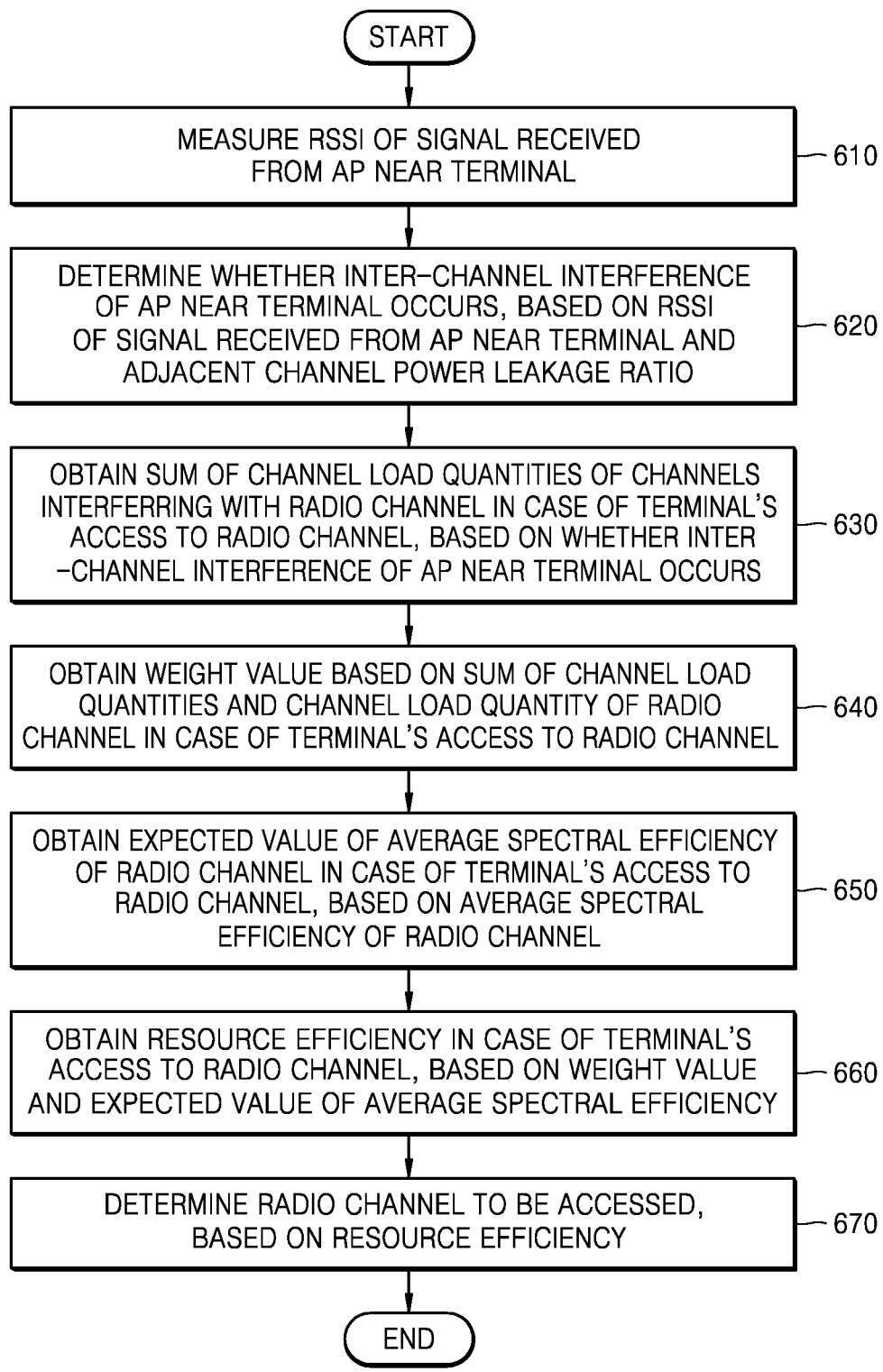
FIG. 6 is a flowchart illustrating a method, performed by a terminal, of determining a radio channel to be accessed, based on load information and channel interference information of an access point (AP) near the terminal, according to an embodiment of the disclosure.

FIG. 6 is a flowchart illustrating a method of determining a radio channel to which a terminal according to an embodiment of the disclosure is to access, based on load information and channel interference information of an AP near the terminal.

With reference to FIG. 6, operation 440 of FIG. 4 will be described in more detail. In operation 430 of FIG. 4, the terminal receives the beacon frame including the load information of the AP near the terminal.

In operation 610, the terminal may measure a received signal strength indicator (RSSI) of a signal received from the AP near the terminal.

In operation 620, the terminal may determine channel interference (or inter-channel interference) of the AP near the terminal, based on an RSSI of a signal received from the AP near the terminal and an adjacent channel power leakage ratio.

Unlike in a frequency band of 5 GHz where non-overlapped channels are mostly used, in a frequency band of 2.5 GHz, other channels than channels #1, #6, and #11 are overlapping channels. Thus, between channels in a frequency band of 2.4 GHz, adjacent channel interference (ACI) may occur, affecting network performance, such that a radio channel to be accessed may have to be determined based on an interference level resulting from ACI.

In an embodiment of the disclosure, a product of the RSSI of the signal received from the AP near the terminal and the adjacent channel power leakage ratio may be measured by an interference level resulting from ACI. The adjacent channel power leakage ratio may mean a ratio of power transmitted in a current channel to power leaking to an adjacent channel. That is, as the adjacent channel power leakage ratio increases, an interference level affecting the adjacent channel increases. The adjacent channel power leakage ratio with respect to a channel in 2.4 GHz may be as shown in Table 1.

TABLE 1

| Channel distance | 1 | 2 | 3 | 4 | 5 |
|---|---|---|---|---|---|
| Power leakage ratio (%) | 79.06 | 52.67 | 26.51 | 0.627 | 0.121 |

In the following embodiment of the disclosure, a detailed description will be made of a method in which the terminal determines channel interference of the AP near the terminal, based on the RSSI of the signal received from the AP near the terminal and the adjacent channel power leakage ratio.

For example, for a channel of the band B of the AP-k that is any one AP among APs near the terminal, the terminal may determine as a radio channel interfering with the channel of the band B of the AP-k, an adjacent radio channel in which an RSSI measured by the terminal while using the same channel as the channel of the band B of the AP-k is greater than or equal to −82 dBm (a minimum threshold value to be detected by carrier sense-based clear channel assessment (CCA)). The terminal may also determine as the radio channel interfering with the channel of the frequency band B of the AP-k, an adjacent radio channel in which a product of an adjacent channel power leakage ratio and an RSSI that is measured by the terminal while using an overlapped channel with the channel of the frequency band B of the AP-k is greater than or equal to −62 dBm (a minimum threshold value to be detected by energy detection-based CCA). When there is a radio channel interfering with the channel of the band B of the AP-k, the terminal may determine that there is channel interference of the AP-k that is the AP near the terminal. Unlike in a frequency band of 5 GHz where non-overlapped channels are mostly used, in a frequency band of 2.4 GHz, other channels than channels #1, #6, and #11 are overlapping channels. According to the above-described embodiment of the disclosure; the terminal may determine interference between the channel of the band B of the AP-k that is any one AP among APs near the terminal and other radio channels.

In operation 630, based on whether channel interference of the AP near the terminal occurs; the terminal may obtain a sum of channel load quantities of channels interfering with a radio channel when the terminal accesses the radio channel. For example, when the terminal accesses the channel of the frequency band B of the AP-k, the terminal may obtain a sum of channel load quantities of radio channels interfering with the channel of the band B of the AP-k based on whether interference between the channel of the band B of the AP-k and other radio channels occurs, determined in operation 620. The sum of the channel load quantities may be defined as below.

$$\sum_{m \in [k] \cup \mathcal{A}_k(B)} L(m, B) \qquad \text{[Equation 4]}$$

Herein; $\mathcal{A}_k(B)$ may mean a set of APs interfering with the band-B of the AP-k, and L(m,B) may mean a load quantity in the band-B of an AP-m.

In operation 640, the terminal may obtain a weight value based on the above-described sum of channel load quantities and a channel load quantity of a radio channel with respect to the terminal's access to the radio channel. For example, the terminal may obtain the weight value, based on the channel load quantity of the radio channel when the terminal accesses the channel of the band-B of the AP-k and on the sum of the channel load quantities of the radio channels interfering with the channel of the band-B of the AP-k. The weight value may be defined as follows:

$$w_i(k, B) = \frac{1}{1 + \frac{\alpha_{k,i}}{C_{k,i}} + \sum_{m \in [k] \cup \mathcal{A}_k(B)} L(m, B)} \qquad \text{[Equation 5]}$$

Herein, may mean a traffic arrival rate of the STA-i associated with the AP-k, and $C_{k,i}$ may mean a transmission speed of a link between the AP-k and the STA-i.

In operation 650, the terminal may obtain an expected value of an average SE of a radio channel with respect to the terminal's access to the radio channel, based on the average SE of the radio channel. For example, the terminal may obtain the expected value of the average SE of the band-B of the AP-k with respect to the terminal's access to the channel of the band-B of the AP-k, based on the average SE δ(k,B) of the band-B of the AP-k. The expected value of the average SE may be defined as below.

$$\Gamma_i(k, B) = \frac{1 + |S(k, B)|}{\frac{1}{f(SNR_{k,i})} + \frac{|S(k, B)|}{\Gamma(k, B)}}$$ [Equation 6]

Herein, Γ(k,B) may mean an average SE of the band-B of the AP-k, may mean the number of accessed terminals for each frequency band of the AP, and f(SNR$_{k,i}$) may mean an SE between the AP-k and the STA-i.

In operation 660, the terminal may obtain a resource efficiency with respect to the terminal's access to the radio channel, based on the weight value and the expected value of the average SE. For example, the terminal may obtain the resource efficiency with respect to the terminal's access to the channel of the band-B of the AP-k, based on the weight value w$_i$(k,B) and the expected value Γ$_i$(k,B) of the average SE. The resource efficiency may be defined as follows:

$$RE_i(k,B) = w_i(k,B) \cdot \Gamma_i(k,B)$$ [Equation 7]

In operation 670, the terminal may determine a radio channel to be accessed, based on the resource efficiency. For example, the terminal may determine as the radio channel to be accessed, AP-k* and band B* in which the resource efficiency is highest, based on the resource efficiency RE$_i$(k,B) with respect to the terminal's access to the channel of the band-B of the AP-k. The radio channel to be accessed may be determined as below.

$$(k^*, B^*) = \underset{k \in \mathcal{A}_i(B), B \in (2.4\,GHz, 5\,GHz)}{\arg\max} RE_i(k, B)$$ [Equation 8]

Herein, $\mathcal{A}_i(B)$ may mean a set of APs using a band-B near the STA-i.

According to the disclosed method, in a situation where dual-band APs are highly dense, the terminal may perform load distribution between APs and bands based on whether radio channel interference occurs, thus improving performance of the WLAN.

Figure 7:
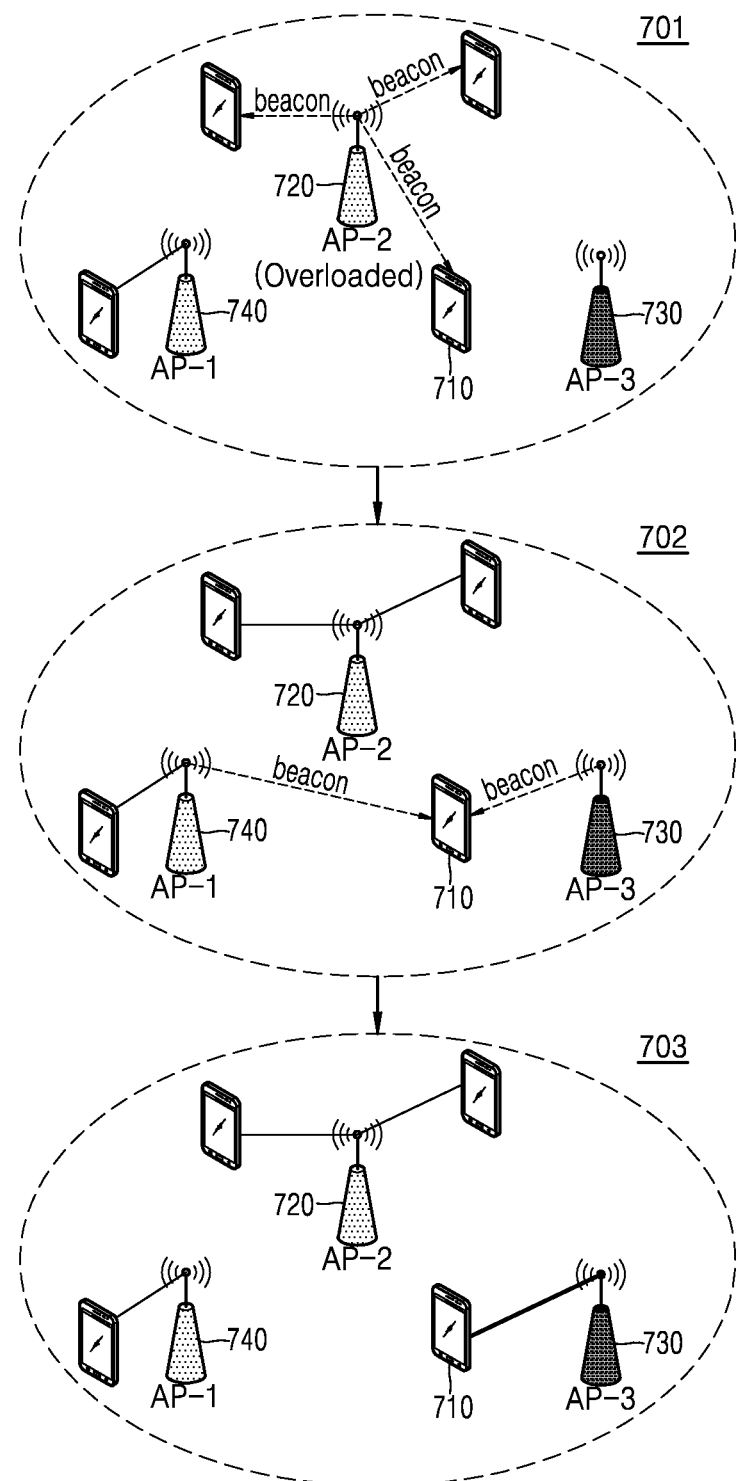
FIG. 7 is a view for describing a method, performed by a terminal, of accessing a radio channel by using a distributed UA scheme, according to an embodiment of the disclosure.

FIG. 7 is a view for describing a method, performed by a terminal, of accessing a radio channel based on a distributed UA scheme, according to an embodiment of the disclosure.

In operation 701, a terminal 710 currently accesses an AP-2 720 with a saturated channel load quantity. The AP-2 720 may transmit a beacon frame including load information of the AP-2 720, and the terminal 710 may receive the beacon frame. The terminal 710 may determine whether to maintain access to the currently accessed AP-2 720, based on the load information of the currently accessed AP-2 720. When the terminal 710 determines not to maintain the access, the terminal 710 goes to operation 702.

In operation 702, the terminal 710 may receive a beacon frame including load information of each AP from each of APs near the terminal 710, e.g., an AP-1 740, the AP-2 720, and the AP-3 730 by scanning the APs near the terminal 710. The terminal 710 may determine and access a radio channel based on the received load information of the AP near the terminal 710 and channel interference information.

Operation 703 shows that the terminal 710 accesses the determined AP-3 730.

Figure 8:
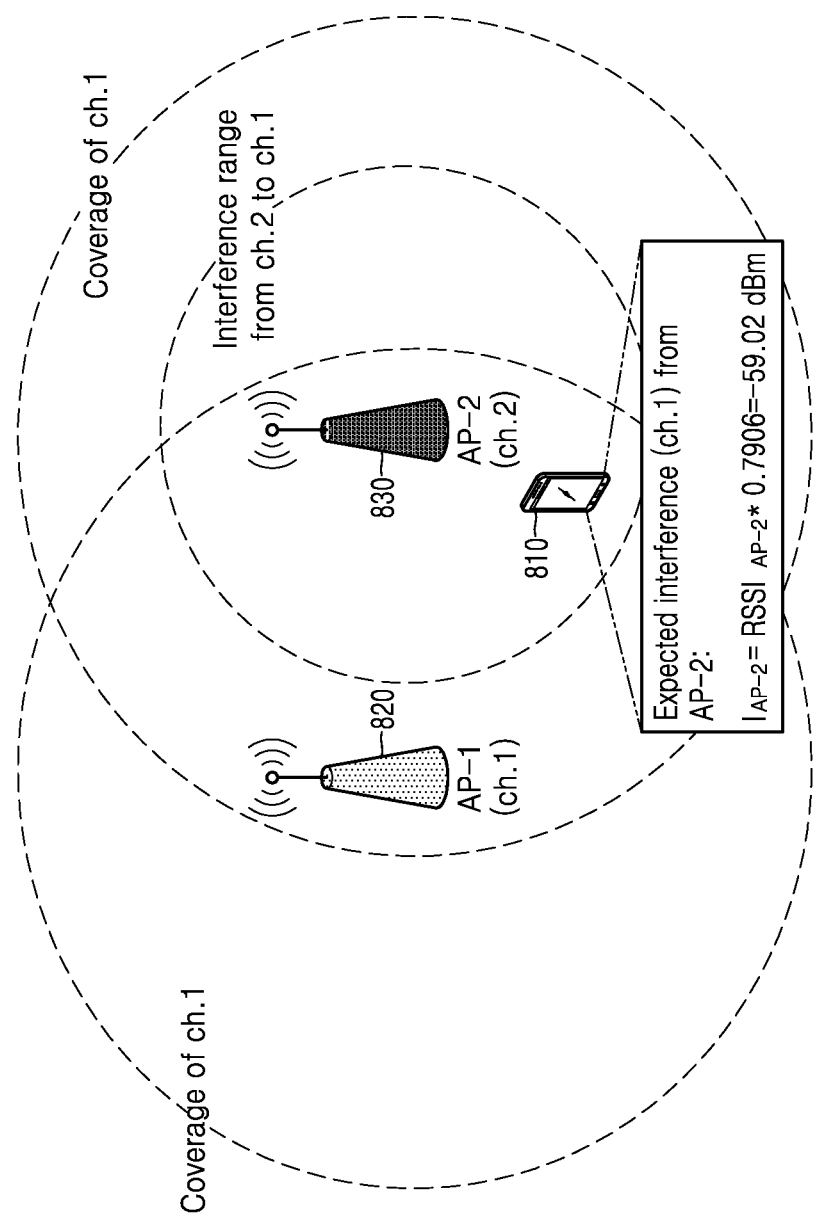
FIG. 8 is a view for describing a method of determining whether channel interference occurs between APs, according to an embodiment of the disclosure.

FIG. 8 is a view for describing a method of determining whether channel interference occurs between APs according to an embodiment of the disclosure.

Referring to FIG. 8, a terminal 810 may determine whether channel interference occurs between APs near the terminal 810. For example, the terminal 810 may determine whether interference occurs between a channel 1 of a 2.4 GHz band of an AP-1 820 and a channel 2 of the 2.4 GHz band of an AP-2 830 in which the AP-1 820 and the AP-2 830 are near the terminal 810. The channel 1 and the channel 2 are adjacent overlapped channels and a product of an RSSI of a signal received from the AP-2 830 and an adjacent channel power leakage ratio, 0.7906, of the channel 1 and the channel 2 (see Table 1), that is, −59.02 dBm, is greater than −62 dBm, such that the terminal 810 may determine that the channel 2 of the 2.4 GHz band of the AP-2 830 is a radio channel that interferes with the channel 1 of the 2.4 GHz band of the AP-1 820.

Figure 9:
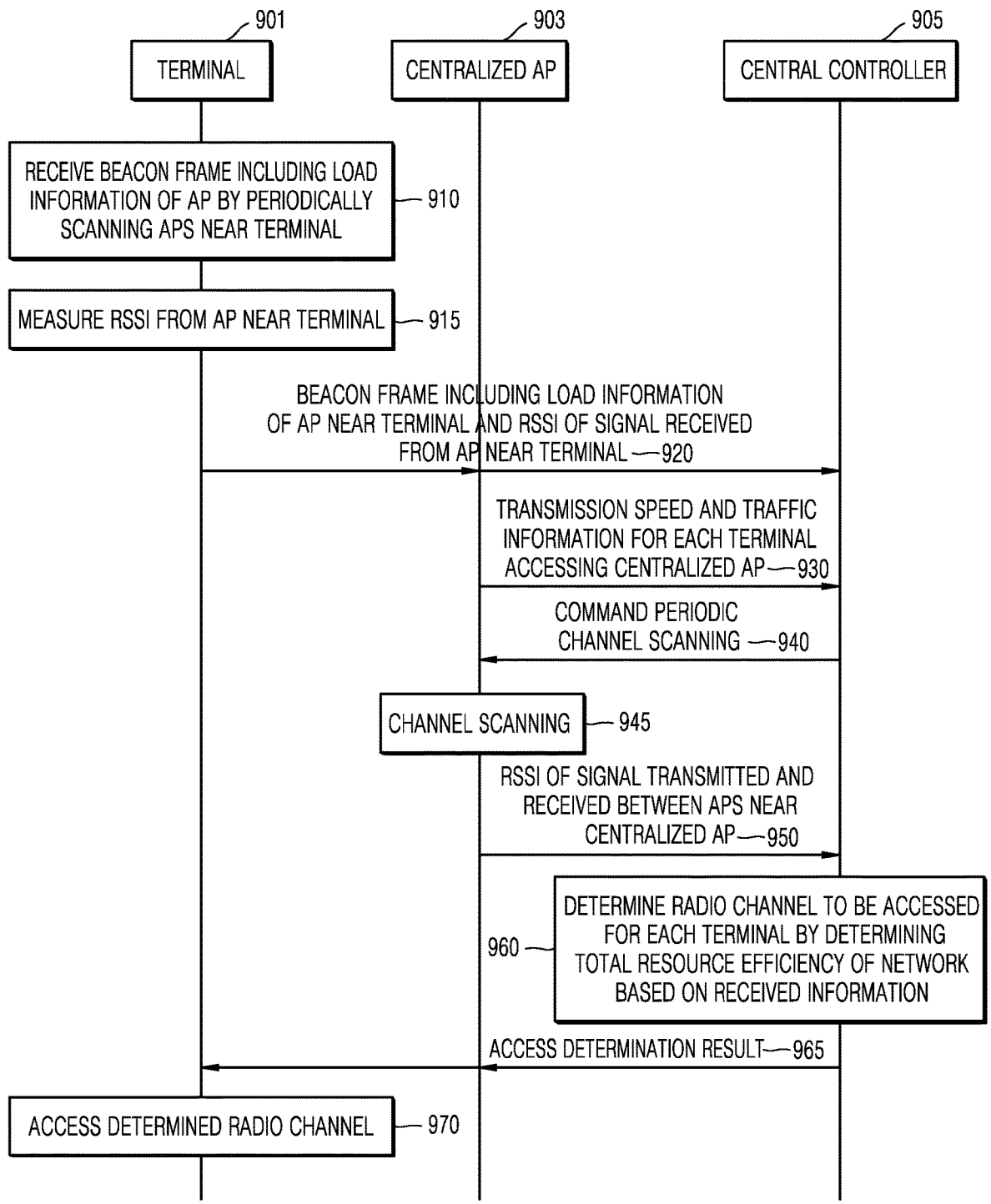
FIG. 9 is a view for describing a method, performed by a terminal, of accessing a radio channel by using a centralized UA scheme, according to an embodiment of the disclosure.

FIG. 9 is a view for describing a method, performed by a terminal, of accessing a radio channel by using a centralized UA scheme, according to an embodiment of the disclosure.

In operation 910, a terminal 901 may also receive a beacon frame including load information of an AP near the terminal 901 by periodically scanning APs near the terminal 901. The terminal 901 may also receive a beacon frame including load information of an AP near the terminal 901 by aperiodically scanning the APs near the terminal 901. The load information of the AP included in the beacon frame may be as disclosed in the description made with reference to FIG. 4. That is, the load information of the AP may include BSS load information which includes the number of accessed terminals for each frequency band of the AP, |S(k,B)|, a channel load quantity for each frequency band of the AP, L(k,B), and an average SE of the AP, Γ(k,B).

In operation 915, the terminal 901 may measure an RSSI of a signal received from an AP near the terminal 901.

In operation 920, the terminal 901 may transmit a beacon frame including load information of the AP near the terminal 901 and the RSSI of the signal received from the AP near the terminal 901 to a centralized AP 903. The centralized AP 903 may transmit the received information to a central controller 905. A period (PR) in which the terminal 901 scans APs near the terminal 901 and transmit the information through operations 910 through 920 may be, for example, 1 minute.

In operation 930, the centralized AP 903 may transmit a transmission speed and traffic information for each terminal accessing the centralized AP 903 to the central controller 905. The traffic information may include a traffic arrival rate of the terminal 901.

In operation 940, the central controller 905 may command the centralized AP 903 to periodically perform channel scanning. A scanning period Pc may be, for example, 12 hours. The central controller 905 may command the centralized AP 903 to aperiodically perform channel scanning.

In operation 945, the centralized AP 903 may scan an AP near the centralized AP 903 according to a channel scan command of the central controller 905. The centralized AP 903 may obtain the RSSI of a signal transmitted and received between APs near the centralized AP 903 through channel scanning.

In operation 950, the centralized AP 903 may transmit the RSSI of a signal transmitted and received between APs near the centralized AP 903 to the central controller 905.

In operation 960, the central controller 905 may determine a total resource efficiency of a network to determine a radio channel to be accessed for each terminal, based on a beacon frame of an AP near the terminal 901, received from the centralized AP 903, a transmission speed and traffic information for each terminal accessing the centralized AP 903, and the RSSI of a signal transmitted and received between APs near the centralized AP 903. A more detailed description will be made in the following embodiment of the disclosure.

Hereinbelow, a description will be made of a method in which the central controller 905 determines whether interference occurs between APs near the centralized AP 903.

The central controller 905 may determine, based on the RSSI of a signal transmitted and received between APs near the centralized AP 903 and an adjacent channel power leakage ratio, whether inter-channel interference occurs between the APs near the centralized AP 903. In an embodiment of the disclosure, a product of the RSSI of the signal transmitted and received between APs near the centralized AP 903 and the adjacent channel power leakage ratio may be measured as an interference level resulting from ACI.

For example, for the channel of the band-B of the AP-k that is any one AP among APs near the centralized AP 903, the central controller 905 may determine as a radio channel interfering with the channel of the band-B of the AP-k, an adjacent radio channel in which an RSSI measured by the AP-k while using the same channel as the channel of the band-B of the AP-k is greater than or equal to −82 dBm (a minimum threshold value to be detected by carrier sense-based clear channel assessment (CCA)). The central controller 905 may also determine as the radio channel interfering with the channel of the band-B of the AP-k, an adjacent radio channel in which a product of an adjacent channel power leakage ratio and an RSSI that is measured by the AP-k while using an overlapped channel with the channel of the band-B of the AP-k is greater than or equal to −62 dBm (a minimum threshold value to be detected by energy detection-based CCA). According to the above-described embodiment of the disclosure, the central controller 905 may determine interference between the channel of the band-B of the AP-k that is any one AP among APs near the centralized AP and other radio channels.

In the disclosure, an STA (terminal) may be classified into a legacy STA and a non-legacy STA. The legacy STA (hereinafter, an L-STA) may be a general STA supporting a WLAN. The non-legacy STA (hereinafter, an NL-STA) may be an STA having embedded therein software or hardware implementing the disclosed method. The NL-STA may be expressed as two types depending on a type of an AP the NL-STA currently accesses. The NL-STA accessing the centralized AP may be expressed as a C-STA, and the STA accessing the stand-alone AP may be expressed as a U-STA. This may be summarized as shown in Table 2.

TABLE 2

| Type | | Description | Whether UA Control S/W is Installed |
|---|---|---|---|
| Legacy STA (L-STA) | | General legacy STA | X |
| Non-legacy STA (NL-STA) | C-STA | Non-legacy STA associated with Centralized AP | O |
| | U-STA | General legacy STA | O |

Hereinbelow, a description will be made of a method in which the central controller 905 obtains a total channel load quantity applied to the band-B of the AP-k that is any one AP among APs existing in the network.

A load quantity of the band-B of the AP-k, L(k, B) may be defined as below.

$$L(k, B) = \sum_{i \in S_C(k,B)} x_i(k, B) \cdot \frac{\alpha_{k,i}}{C_{k,i}} + \sum_{j \in S_{NC}(k,B)} \frac{\alpha_{k,j}}{C_{k,j}} \quad \text{[Equation 9]}$$

Herein, $x_i(k,B)$ may mean a binary indicator indicating association of the STA-i with respect to the band-B of the AP-k, $S_C(k,B)$ may mean a set of C-STAs associated with the band-B of the AP-k, $S_{NC}(k,B)$ may mean a set of non C-STAs (i.e., U-STAs and L-STAs) associated with the band-B of the AP-k, may mean a traffic arrival rate of the STA-i associated with the AP-k, and $C_{k,i}$ may mean a transmission speed of a link between the AP-k and the STA-i.

Next, a total channel load quantity applied to the band-B of the AP-k may be $L^{tot}(k,B)$, which may be defined as a result of adding a load quantity of radio channels interfering with the above-described channel to the channel load quantity of the band-B of the AP-k. This may be defined as follows:

$$L_{tot}(k, B) := \sum_{m \in [k] \cup \mathcal{A}_k(B)} L(m, B) \quad \text{[Equation 10]}$$

Herein $\mathcal{A}_k(B)$ may mean a set of APs interfering with the band-B of the AP-k.

Hereinbelow, a description will be made of a method in which the central controller 905 determines a total resource efficiency of a network based on a beacon frame of an AP near the terminal 901, received from the centralized AP 903, a transmission speed and traffic information for each terminal accessing the centralized AP 903, an RSSI of a signal transmitted and received between APs near the centralized AP 903, an adjacent channel power leakage ratio, and whether inter-channel interference of the AP near the centralized AP 903 occurs.

The total resource efficiency of the network may be defined as follows $$\sum_B \sum_{k \in \mathcal{A}(B)} RE(k, B) \quad \text{[Equation 11]}$$

Herein, RE(k, B) may mean a resource efficiency in the band-B of the AP-k, and may be defined as below.

$$RE(k,B) = w(k,B) \cdot \Gamma(k,B) \quad \text{[Equation 12]}$$

Herein, may mean a weight value based on a channel load quantity applied to the band-B of the AP-k and may be defined as below.

$$w(k,B) = \{1 + L_{tot}(k,B)\}^{-1} \quad \text{[Equation 13]}$$

In Equation 12, $\Gamma(k, B)$ may mean an average SE in the band-B of the AP-k, and may be defined as below.

$$\Gamma(k, B) = \frac{\sum_{i \in S_C(k,B)} x_i(k, B) + |S_{NC}(k, B)|}{\sum_{i \in S_C(k,B)} \frac{x_i(k, B)}{f(SNR_{k,i})} + \sum_{j \in S_C(k,B)} \frac{1}{f(SNR_{k,j})}} \quad \text{[Equation 14]}$$

Herein, $x_i(k, B)$ may mean a binary indicator indicating association of the STA-i with respect to the band-B of the AP-k, $S_C(k,B)$ may mean a set of C-STAs associated with the band-B of the AP-k, $S_{NC}(k,B)$ may mean a set of non C-STAs (i.e., U-STAs and L-STAs) associated with the band-B of the AP-k, and $f(SNR_{k,i})$ may an SE between the AP-k and the STA-i.

The central controller 905 may determine a radio channel that each terminal is to access to maximize a total resource efficiency of the network. This may be defined as follows:

$$\text{maximize} \sum_{B} \sum_{k \in \mathcal{A}(B)} RE(k, B) \quad \text{[Equation 15]}$$

Herein, $\mathcal{A}$ (B) may mean a set of all APs existing in the network.

Constraints of Equation 15 may be defined by Equation 16 and Equation 17.

Equation 16 may mean as a constraint for association of the STA-i, that the STA-i is associated with a particular band of any AP in the network.

$$\sum_{B} \sum_{k \in \mathcal{A}(B)} x_i(k, B) = 1, \ \forall \ x_i(k, B) \in \{0, 1\} \quad \text{[Equation 16]}$$

Herein, $\mathcal{A}$ (B) may mean a set of all APs existing in a network, and $x_i(k, B)$ may mean a binary indicator indicating association of the STA-i with respect to the band-B of the AP-k.

Equation 17 is a constraint for a channel load quantity applied to the band-B of the AP-k, $L_{tot}(k, B)$, which may mean that $L_{tot}(k,B)$ should be less than a predefined channel load quantity threshold value $L_{th}$.

$$L_{tot}(k,B) \leq L_{th} \quad \text{[Equation 17]}$$

Equation 15 is a mixed integer quadratic fractional programming (MIQFP) problem, and is NP-Hard. Thus, the following description will be made of a method of obtaining a solution by transforming this problem into a soluble problem.

As in Equation 13, w(k,B) has a fractional form, such that an objective function [Equation 15] that is a product of w(k,B) and Γ(k,B) is an MIQFP problem having a fractional form. To transform this problem into a soluble mixed integer quadratic programming (MIQP) problem, an additional parameter has to be introduced using a parametric technique. In this way, the MIQFP problem having a fractional form may be transformed into an MIQP problem having a quadratic form. An equation obtained by transforming the original problem Equation 13 into the MIQP problem by introducing a parameter $\lambda(k, B)$ may be expressed as below, $$\text{maximize} \sum_{B} \sum_{k \in \mathcal{A}(B)} \left\{ \Sigma_{i \in S_C(k,B)} x_i(k, B) + |S_{NC}(k, B)| - \frac{\lambda(k, B)}{w(k, B)} \cdot \left( \sum_{i \in S_C(k,B)} \frac{x_i(k, B)}{f(SNR_{k,i})} + \sum_{j \in S_{NC}(k,B)} \frac{1}{f(SNR_{k,j})} \right) \right\} \quad \text{[Equation 18]}$$

Constraints of Equation 18 may be defined by Equation 16 and Equation 17.

According to Equation 18, the original problem Equation 15 may be transformed into the MIQP problem Equation 18 that is optimally soluble by a branch and bound technique due to a given value $\lambda(k,B)$, This problem may obtain a solution by using a CPLEX MIQP solver to be described below.

To obtain a solution to the problem of Equation 18, $\lambda(k,B)$ should be defined first, According to a Dinkelbach's method, an initial $\lambda(k,B)$ may be set to 0 and may be continuously renewed. An algorithm ends when a $\lambda(k,B)$ difference before and after renewal is less than a predefined threshold value $\epsilon$. The algorithm for obtaining the solution to the problem Equation 18 is as below.

[Equation 19]
Algorithm 1 Optional UA Algorithm

For all B ∈ {2.4 GHz, 5 GHz} and k ∈ $\mathcal{A}$(B),
  $\lambda$(k, B) ← 0, old$\lambda$(k, B) ← 1.
  $\epsilon$ ← $10^{-5}$, stop ← false.
while stop = false do
  Solve the problem using MIQP solver, given $\lambda$(k,B)
  stop ← true
  for all B ∈ {2.4 GHz, 5 GHz} and k ∈ $\mathcal{A}$(B) do
    if |$\lambda$(k,B) − old$\lambda$(k, B)| > $\epsilon$ then
      old$\lambda$(k, B) ← $\lambda$(k, B)
      $\lambda(k, B) \leftarrow \frac{w(k, B) \cdot \left( \sum_{i \in S_C} x_i(k, B) + |S_{NC}(k, B)| \right)}{\sum_{i \in S_C(k,B)} \frac{x_i(k, B)}{f(SNR_{k,i})} + \sum_{j \in S_{NC}(k,B)} \frac{1}{f(SNR_{k,j})}}$
      stop ← false
    end if
  end for
end while
return The optimal association results, $x_i$(k, B) ∈ $S_C$(k, B)

In operation 965, the central controller 905 may transmit a result of determining a radio channel to be accessed for each terminal to the centralized AP 903 that may transmit a received result to the terminal 901. The central controller 905 may periodically determine a radio channel to be accessed for each terminal, and a period ($P_D$) may be, for example, 5 minutes. The central controller 905 may aperiodically determine a radio channel to be accessed for each terminal.

In operation 970, the terminal 901 may receive the result of determining a radio channel to be accessed for each terminal and access the determined radio channel based on the result.

According to the disclosed method, in a situation where dual-band APs are highly dense, the terminal may perform load distribution between APs and bands based on whether interference occurs between radio channels, thus improving performance of the WLAN. The terminal may not only adjust an access to existing centralized APs based on a current network condition (channel load quantity and radio channel quality), but also access a stand-alone AP considering a network condition of the stand-alone AP together.

Figure 10:
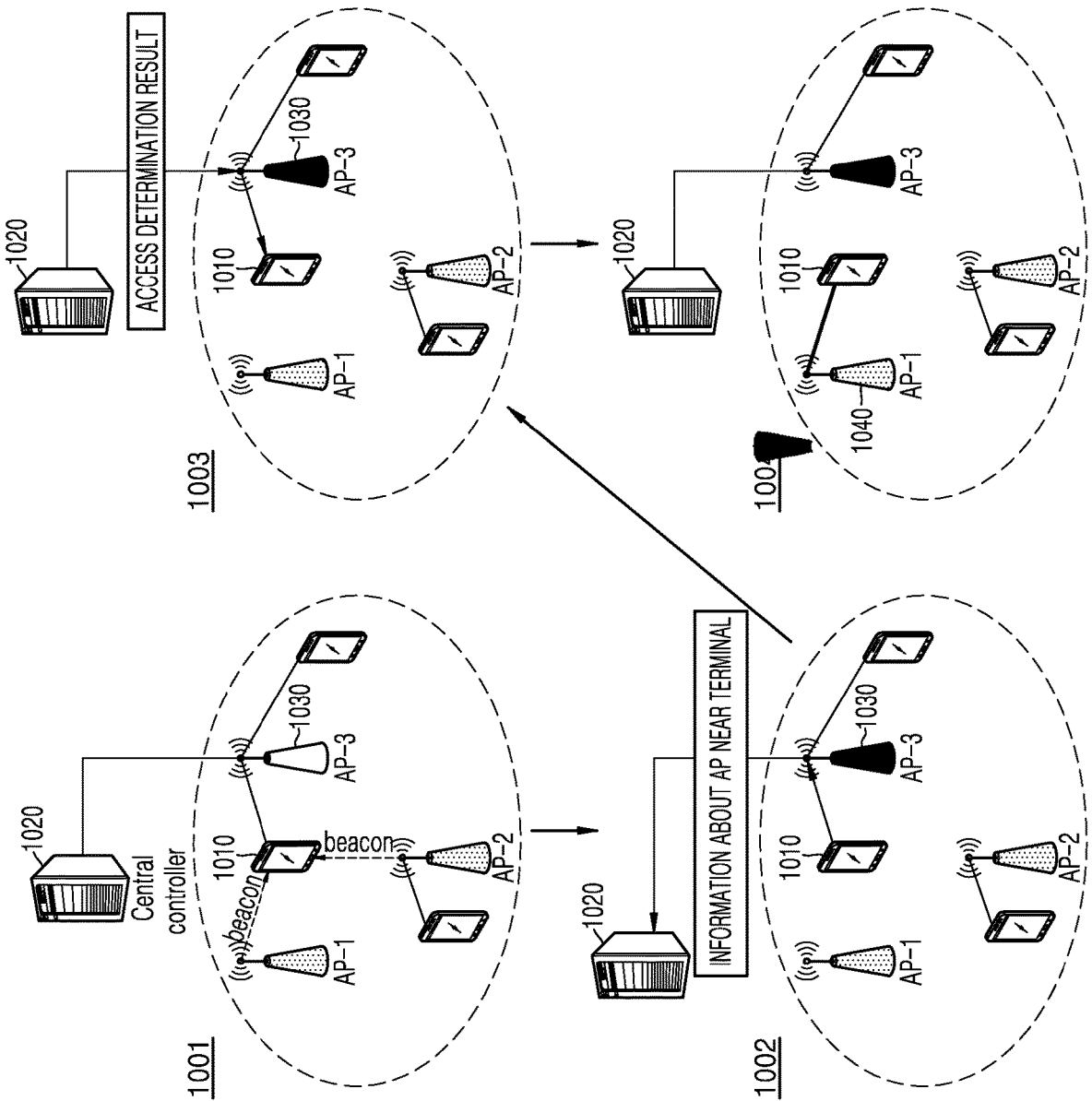
FIG. 10 is a view for describing a method, performed by a terminal, of accessing a radio channel by using a centralized UA scheme, according to an embodiment of the disclosure.

FIG. 10 is a view for describing a method, performed by a terminal, of accessing a radio channel by using a centralized UA scheme, according to an embodiment of the disclosure.

In operation 1001, a terminal 1010 currently accesses an AP-3 1030. The terminal 1010 may also receive a beacon frame including load information of an AP near the terminal 1010 by periodically scanning APs near the terminal 1010. The terminal 1010 may also receive a beacon frame including load information of an AP near the terminal 1010 by aperiodically scanning the APs near the terminal 1010. In FIG. 10, the terminal 1010 may receive a beacon frame including load information of each AP from each of the APs near the terminal 1010, e.g., an AP-1, an AP-2, and an AP-3 1030. The terminal 1010 may measure an RSSI of a signal received from the AP-1, the AP-2, and the AP-3 1030. The centralized AP, the AP-3 1030 may be controlled by a central controller 1020.

In operation 1002, the central controller 1020 may receive a beacon frame including load information of an AP near the terminal 1010 and the RSSI of the signal received from the AP near the terminal 1010, from the terminal 1010 through the AP-3 1030.

In operation 1001 or 1002, the AP-3 1030 may transmit and receive information to and from the central controller

1020 under control of the central controller 1020. This has been described in detail with reference to operations 920 through 950 of FIG. 9.

In operation 1003, the central controller 1020 may determine a total resource efficiency of a network based on information of the AP-3 1030 received from the AP-3 1030 and information received by the AP-3 1030 from the terminal 1010, determine a radio channel to be accessed for each terminal based on the total resource efficiency, and transmit an access determination result to the AP-3 1030. The AP-3 1030 may transmit the access determination result to the terminal 1010. A method of determining the access determination result has been described in detail with reference to operation 960 of FIG. 9.

In operation 1004, the terminal 1010 may access an AP-1 1040 to which an access is determined.

Figure 11:
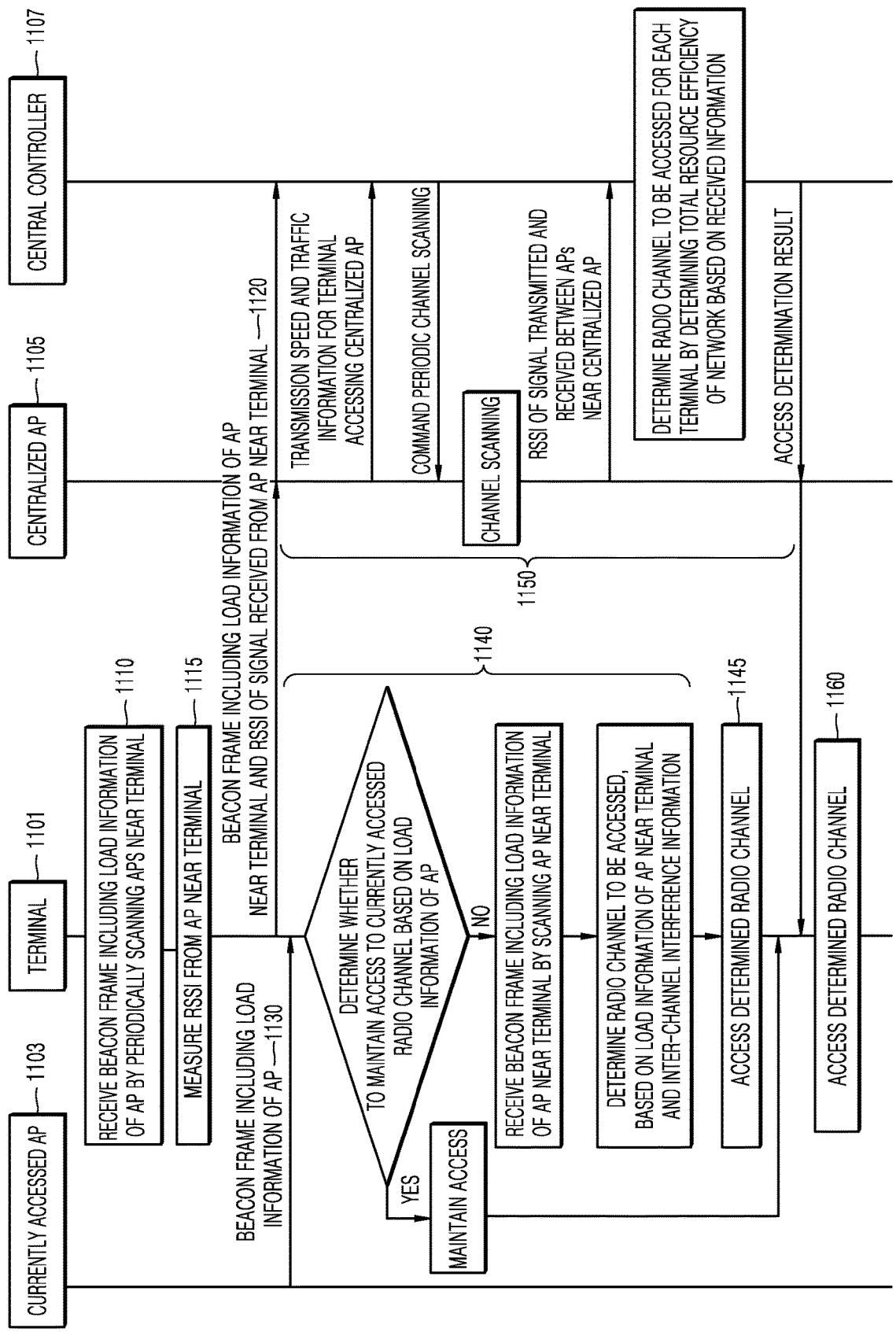
FIG. 11 is a view for describing a method, performed by a terminal, of accessing a radio channel by using a scheme in which a distributed UA scheme and a centralized UA scheme are mixed, according to an embodiment of the disclosure.

FIG. 11 is a view for describing a method, performed by a terminal, of accessing a radio channel by using a distributed UA scheme and a centralized UA scheme, according to an embodiment of the disclosure.

Referring to FIG. 11, a terminal 1101 may access a radio channel to which an access is determined, by using the distributed UA scheme described with reference to FIG. 4 and the centralized UA scheme described with reference to FIG. 9. Each of operations 1110 through 1160 of FIG. 11 are the same as operations 510 through 550 of FIG. 5 and operations 910 through 970 of FIG. 9, and thus will be described in brief.

Operations 1110 through 1120 show a method in which the terminal 1101 may obtain information about an AP near the terminal 1101, transmit the information to a centralized AP 1105, and transmit the information to a central controller 1107 through the centralized AP 1105, according to the centralized UA scheme. In operation 1110, the terminal 1101 may receive a beacon frame including load information of an AP by periodically scanning APs near the terminal 1101. The terminal 1101 may also receive a beacon frame including load information of an AP near the terminal 1101 by aperiodically scanning the APs near the terminal 1101. In operation 1115, the terminal 1101 may measure an RSSI of a signal received from an AP near the terminal 1101. In operation 1120, the terminal 1101 may transmit a beacon frame including load information of the AP near the terminal 1101 and the RSSI of the signal received from the AP near the terminal 1101 to a centralized AP 1105, and transmit the beacon frame and the RSSI to the central controller 1107 through the centralized AP 1105.

Operation 1130 shows a method in which the terminal 1101 obtains information about a currently accessed AP 1103 according to the distributed UA scheme. In operation 1130, the terminal 1101 may receive a beacon frame including load information of the currently accessed AP 1103 from the currently accessed AP 1103.

In FIG. 11, it is illustrated that the terminal 1101 obtains information about an AP near the terminal 1101 and transmits the information to the centralized AP 1105 by using the centralized UA scheme in operations 1110 through 1120, and then receives a beacon frame including load information of the currently accessed AP 1103 from the currently accessed AP 1103 by using the distributed UA scheme in operation 1130. However, an order of operations 1110 through 1120 and operation 1130 is not limited by the figure. For example, the terminal 1101 may receive a beacon frame including load information of the currently accessed AP 1103 from the currently accessed AP 1103 by using the distributed UA scheme in operation 1130, and obtain information about an AP near the terminal 1101 and transmit the information to the centralized AP 1105, and transmit the information to the central controller 1107 through the centralized AP 1105 by using the centralized UA scheme according to operations 1110 through 1120. Operations 1110 through 1120 of FIG. 11 may be within operation 1140, and likewise, operation 1130 may be within operation 1150.

Operation 1140 shows a method in which the terminal 1101 determines a radio channel to be accessed, according to the distributed UA scheme. Operation 1150 shows a method in which the terminal 1101 determines a radio channel to be accessed, according to the centralized UA scheme. Depending on the two methods, the radio channels to which access of the terminal 1101 is determined may be the same as or different from each other. In FIG. 11, it is illustrated that a radio channel that the terminal 1101 is to access is first determined in operation 1140 and thus the terminal 1101 accesses the radio channel in operation 1145, and then a radio channel to be accessed is determined in operation 1150 and the terminal 1101 newly accesses the radio channel in operation 1160, such that the access to the radio channel in operation 1145 may be maintained or changed depending on a result of operation 1140. However, an order of operations 1140 and 1150 is not limited by the figure. For example, a radio channel that the terminal 1101 is to access is first determined in operation 1150 and thus the terminal 1101 accesses the radio channel in operation 1160, and then a radio channel to be accessed is determined in operation 1140 and the terminal 1101 newly accesses the radio channel in operation 1145, such that the access to the radio channel in operation 1160 may be maintained or changed depending on a result of operation 1150.

When the centralized UA scheme based on the central controller 1107 is excessively often performed, an effective connection time may be reduced, causing an overhead. Thus, a centralized UA determination period $P_D$ may need to be set to a relatively long period (e.g., several tens of seconds through several minutes). As such, in a system in which a UA is determined in every period, the terminal 1101 may have a difficulty in actively dealing with a change in a network condition (change in a traffic volume or radio channel quality) occurring between a previous determination period and a next determination period.

In the current embodiment of the disclosure, by using the distributed UA scheme during use of the centralized UA scheme, this problem may be complemented. By using the distributed UA scheme, the terminal 1101 may continuously recognize a load condition of a currently associated AP through beacon reception. When a load quantity of the currently associated AP increases over a certain level between determination periods of the centralized UA scheme, the terminal 1101 may access an AP having a small load quantity and a good transmission efficiency near the terminal 1101.

Figure 12:
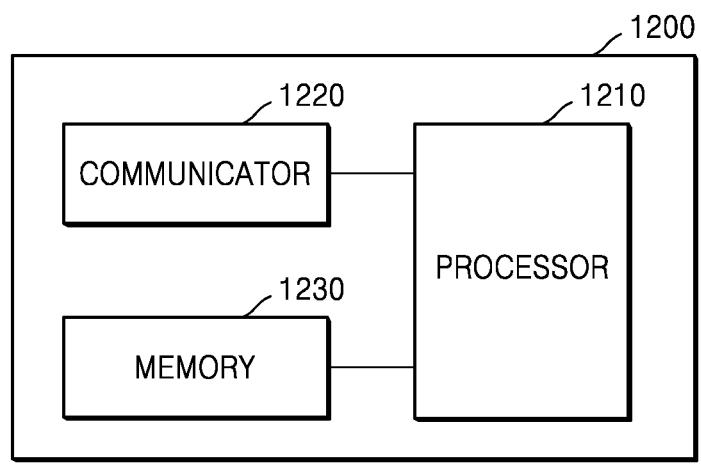
FIG. 12 illustrates an internal structure of a terminal according to an embodiment of the disclosure.

FIG. 12 illustrates an internal structure of a terminal according to an embodiment of the disclosure.

The terminal described above with reference to FIGS. 1 through 11 may correspond to a terminal 1200 of FIG. 12. Referring to FIG. 12, the terminal 1200 may include a communicator 1220, a memory 1230, and a processor 1210. According to the above-described communication method of the terminal 1200, the communicator 1220, the memory 1230, and the processor 1210 of the terminal 1200 may operate. However, components of the terminal 1200 are not limited to the above-described example. For example, the terminal 1200 may include components that are more than or less than the above-described components. The communicator 1220, the memory 1230, and the processor 1210 may be implemented in a single chip form.

The communicator 1220 may transmit and receive a signal to and from an AR To this end, the communicator 1220 may include a radio frequency (RF) transmitter and an RF receiver. However, this is merely an example of the communicator 1220, components of which are not limited to the RF transmitter and the RF receiver. The communicator 1220 may be referred to as a transceiver. The communicator 1220 may receive a signal through a radio channel and output the received signal to the processor 1210, and transmit a signal output from the processor 1210 through the radio channel.

A program, data, and one or more instructions needed for an operation of the terminal 1200 may be stored in the memory 1230. Control information or data included in a signal obtained by the terminal 1200 may be stored in the memory 1230. The memory 1230 may include a storage medium such as read only memory (ROM), random access memory (RAM), hard-disk, compact disc (CD)-ROM, digital versatile disc (DVD), etc., or a combination thereof. The memory 1230 may also include a plurality of memories.

The processor 1210 may execute one or more instructions stored in the memory 1230 to control a series of processes such that the terminal 1200 may operate according to the above-described embodiments of the disclosure. According to an embodiment of the disclosure, the processor 1210 may receive a beacon frame including load information of a currently accessed AP, determine whether to maintain an access to a currently accessed radio channel, based on the load information of the currently accessed AP, receive a beacon frame including load information of the AP near the terminal 1200 by scanning the AP near the terminal 1200, when determining not to maintain the access to the currently accessed radio channel, determine a radio channel to be accessed, based on the load information of the AP near the terminal 1200 and inter-channel interference information, and accessing the determined radio channel.

According to an embodiment of the disclosure, the load information of the channel of the AP, received by the processor 1210, may include BSS load information including a number of accessed terminals for each frequency band of the AP, a channel load quantity for each frequency band of the AP, and an average spectral efficiency of the AP.

According to an embodiment of the disclosure, the processor 1210 may determine an AP to be accessed, a frequency band to be used, and a channel number to be used.

According to an embodiment of the disclosure, the processor 1210 may determine whether to maintain the access to the currently accessed radio channel based on a number of terminals accessing a currently accessed band of the currently accessed AP, when a channel load quantity of the currently accessed radio channel is greater than or equal to a threshold value.

According to an embodiment of the disclosure, the inter-channel interference information used by the processor 1210 to determine the radio channel to be accessed may include inter-channel interference information of the AP near the terminal 1200, and the processor 1210 may measure an RSSI of a signal received from the AP near the terminal 1200 and determine whether inter-channel interference of the AP near the terminal 1200 occurs, based on the RSSI of the signal received from the AP near the terminal 1200 and an adjacent channel power leakage ratio.

According to an embodiment of the disclosure, the processor 1210 may obtain a sum of channel load quantities of channels interfering with the radio channel with respect to the terminal's access to the radio channel, based on whether the inter-channel interference of the AP near the terminal 1200 occurs, obtain a weight value based on the sum of the channel load quantities and a channel load quantity of the radio channel with respect to the terminal's access to the radio channel, obtain an expected value of an average spectral efficiency of the radio channel with respect to the terminal's access to the radio channel, based on an average spectral efficiency of the radio channel, obtain a resource efficiency with respect to the terminal's access to the radio channel, based on the weight value and the expected value of the average spectral efficiency, and determine the radio channel to be accessed, based on the resource efficiency.

According to an embodiment of the disclosure, the processor 1210 may receive a beacon frame including the load information of the AP near the terminal 1200 by periodically scanning the AP near the terminal 1200, measure the RSSI of the signal received from the AP near the terminal 1200, transmit the beacon frame including the load information of the AP near the terminal 1200 and the RSSI of the signal received from the AP near the terminal 1200 to a centralized AP that is controlled by a central controller, receive an access determination result from the centralized AP and access the radio channel to which the access of the terminal 1200 is determined, based on the access determination result.

According to an embodiment of the disclosure, the access determination result received by the processor 1210 from the centralized AP may include a result obtained in a way that the central controller determines a total resource efficiency of a network based on the beacon frame of the AP near the terminal 1200, a transmission speed and traffic information for each of terminals accessing the centralized AP, and an RSSI of an AP near the centralized AP, and determine a radio channel to be accessed for each terminal based on the determined total resource efficiency of the network, in which the total resource efficiency, the transmission speed and the traffic information for each terminal, and the RSSI are received by the central controller from the centralized AP.

According to an embodiment of the disclosure, the access determination result received by the processor 1210 from the centralized AP may include the total resource efficiency of the network determined in a way that the central controller determines whether inter-channel interference occurs between APs near the centralized AP based on the RSSI of the AP near the centralized AP and an adjacent channel power leakage ratio and determines the total resource efficiency of the network based on whether inter-channel interference occurs between the APs near the centralized AP.

Herein, a description has been made using only some operations of the above-described embodiment of the disclosure as an example in relation to an operation of the processor 1210, but the processor 1210 may control all processes such that the terminal 1200 may operate according to the entire embodiment of the disclosure described above or a part thereof.

The methods according to the embodiments of the disclosure described in the claims or specification of the disclosure may be executed or implemented by hardware, software, or a combination thereof.

When the methods are implemented by software, a computer-readable storage medium having stored therein one or more programs (software modules) or a computer program product including a recording medium having stored therein a program may be provided. The one or more programs stored in the computer-readable storage medium or computer program product may be configured for execution by one or more processors in an electronic device. The one or more programs include instructions that cause the electronic device to execute the methods according to the embodiments of the disclosure described in the claims or the specification of the disclosure.

These programs (software modules and software) may be stored in random access memories (RAMs), nonvolatile memories including flash memories, read only memories (ROMs), electrically erasable programmable ROMs (EE-PROMs), magnetic disc storage devices, compact disc-ROMs (CD-ROMs), digital versatile discs (DVDs), other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, LAN, WLAN, or storage area network (SAN), or a communication network by combining the networks. The storage device may access a device performing the embodiment of the disclosure through an external port. Furthermore, a separate storage device in a communication network may access a device performing the embodiment of the disclosure.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

Meanwhile, the embodiments of the disclosure disclosed in the present specification and drawings have been provided to easily describe the disclosure and to help understanding of the disclosure, and are not intended to limit the scope of the disclosure. In other words, it is apparent to one of ordinary skill in the art that various changes may be made thereto without departing from the scope of the disclosure. In addition, the embodiments of the disclosure may be used in combination when necessary. For example, a base station and a terminal may be managed by combining an embodiment of the disclosure with some parts of another embodiment of the disclosure. In addition, other modifications based on the technical spirit of the above-described embodiment of the disclosure may also be carried out in other communication systems.

The invention claimed is:

1. A method, performed by a terminal, of accessing an access point (AP) in a wireless communication system, the method comprising:
   receiving a beacon frame comprising first load information of an accessed AP per radio channel unit;
   determining whether to maintain an accessed radio channel of the accessed AP, based on the first load information;
   receiving a beacon frame comprising second load information of an AP near the terminal in case that it is determined not to maintain the accessed radio channel;
   determining a radio channel to be accessed, based on the second load information and channel interference information; and
   accessing the determined radio channel, wherein radio channel to be accessed is determined by:
   measuring a received signal strength indicator (RSSI) of a signal received from the AP near the terminal,
   determining whether channel interference of the AP near the terminal occurs, based on the measured RSSI and an adjacent channel power leakage ratio having a pre-determined value according to a channel distance,
   obtaining a sum of channel load quantities of channels interfering with the radio channel of the accessed AP in case that the channel interference of the AP near the terminal occurs,
   obtaining a weight value based on the sum of the channel load quantities and a channel load quantity of the radio channel to be accessed, wherein the weight value is inversely proportional to the sum of the channel load quantities,
   obtaining an expected value of an average spectral efficiency of the radio channel to be accessed, based on the average spectral efficiency of the radio channel to be accessed, and
   obtaining a resource efficiency of the radio channel to be accessed based on the weight value and the expected value of the average spectral efficiency.

2. The method of claim 1, wherein the second load information of the AP comprises basic service set (BSS) load information comprising a number of accessed terminals for each frequency band of the AP, a channel load quantity for each frequency band of the AP, and an average spectral efficiency of the AP.

3. The method of claim 1, wherein determining the radio channel to be accessed comprises determining an AP to be accessed, a frequency band to be used, and a channel number to be used.

4. The method of claim 2, wherein determining whether to maintain the accessed radio channel comprises determining whether to maintain accessed radio channel based on a number of terminals accessing a currently accessed band of the currently accessed AP, when a channel load quantity of the currently accessed radio channel is greater than or equal to a threshold value.

5. The method of claim 1, further comprising:
   receiving the beacon frame comprising the second load information of the AP near the terminal by periodically scanning the AP near the terminal;
   transmitting the beacon frame comprising the second load information of the AP near the terminal and the RSSI of the signal received from the AP near the terminal to a centralized AP that is controlled by a central controller; and
   receiving an access determination result from the centralized AP and accessing the radio channel to which the access of the terminal is determined, based on the access determination result.

6. The method of claim 5, wherein the access determination result comprises a result obtained when the central controller determines a total resource efficiency of a network based on the beacon frame of the AP near the terminal, a transmission speed and traffic information for each of terminals accessing the centralized AP, and an RSSI of an AP near the centralized AP, and determines a radio channel to be accessed for each terminal based on the determined total resource efficiency of the network, wherein the total resource efficiency, the transmission speed and the traffic information for each terminal, and the RSSI are received by the central controller from the centralized AP.

7. The method of claim 6, wherein the total resource efficiency of the network is determined when the central controller determines whether channel interference occurs between APs near the centralized AP based on the RSSI of the AP near the centralized AP and an adjacent channel power leakage ratio and determines the total resource efficiency of the network based on whether channel interference occurs between the APs near the centralized AP.

8. A terminal accessing an access point (AP) in a wireless communication system, the terminal comprising:
    a communicator configured to communicate with a plurality of APs;
    a memory storing one or more instructions; and
    at least one processor configured to execute the one or more instructions to:
        receive a beacon frame comprising first load information of an accessed AP per radio channel unit;
        determine whether to maintain an accessed radio channel of the accessed AP, based on the first load information;
        receive a beacon frame comprising second load information of an AP near the terminal in case that it is determined not to maintain the accessed radio channel;
        determine a radio channel to be accessed based on second load information and channel interference information; and
        access the determined radio channel,
    wherein the at least one processor is further configured to execute the one or more instructions to determine the radio channel to be accessed by:
        measuring a received signal strength indicator (RSSI) of a signal received from the AP near the terminal;
        determining whether channel interference of the AP near the terminal occurs, based on the measured RSSI and an adjacent channel power leakage ratio having a pre-determined value according to a channel distance,
        obtaining a sum of channel load quantities of channels interfering with the radio channel of the accessed AP in case that the channel interference of the AP near the terminal occurs,
        obtaining a weight value based on the sum of the channel load quantities and a channel load quantity of the radio channel to be accessed, wherein the weight value is inversely proportional to the sum of the channel load quantities,
        obtaining an expected value of an average spectral efficiency of the radio channel to be accessed, based on the average spectral efficiency of the radio channel to be accessed, and
        obtaining a resource efficiency of the radio channel to be accessed based on the weight value and the expected value of the average spectral efficiency.

9. The terminal of claim 8, wherein the second load information of a channel of the AP comprises basic service set (BSS) load information comprising a number of accessed terminals for each band of the AP, a channel load quantity for each frequency band of the AP, and an average spectral efficiency of the AP.

10. The terminal of claim 8, wherein the at least one processor is further configured to execute the one or more instructions to determine the radio channel to be accessed, by determining an AP to be accessed, a frequency band to be used, and a channel number to be used.

11. The terminal of claim 9, wherein the at least one processor is further configured to execute the one or more instructions to determine whether to maintain the access to the currently accessed radio channel based on a number of terminals accessing a currently accessed band of the currently accessed AP, when a channel load quantity of the currently accessed radio channel is greater than or equal to a threshold value.

12. The terminal of claim 9, wherein the at least one processor is further configured to execute the one or more instructions to:
    obtain a sum of channel load quantities of channels interfering with the radio channel with respect to the terminal's access to the radio channel, based on whether the channel interference of the AP near the terminal occurs;
    obtain a weight value based on the sum of the channel load quantities and a channel load quantity of the radio channel with respect to the terminal's access to the radio channel;
    obtain an expected value of an average spectral efficiency of the radio channel with respect to the terminal's access to the radio channel, based on an average spectral efficiency of the radio channel;
    obtain a resource efficiency with respect to the terminal's access to the radio channel, based on the weight value and the expected value of the average spectral efficiency; and
    determine the radio channel to be accessed, based on the resource efficiency.

13. The terminal of claim 8, wherein the at least one processor is further configured to execute the one or more instructions to:
    receive the beacon frame comprising the load information of the AP near the terminal by periodically scanning the AP near the terminal;
    measure an RSSI of the signal received from the AP near the terminal; and
    transmit the beacon frame comprising the load information of the AP near the terminal and the RSSI of the signal received from the AP near the terminal to a centralized AP that is controlled by a central controller, receive an access determination result from the centralized AP, and access the radio channel to which the access of the terminal is determined, based on the access determination result.

14. The terminal of claim 13, wherein the access determination result comprises a result obtained when the central controller determines a total resource efficiency of a network based on the beacon frame of the AP near the terminal, a transmission speed and traffic information for each of terminals accessing the centralized AP, and an RSSI of an AP near the centralized AP, and determines a radio channel to be accessed for each terminal based on the determined total resource efficiency of the network, wherein the total resource efficiency, the transmission speed and the traffic information for each terminal, and the RSSI are received by the central controller from the centralized AP.

15. The terminal of claim 14, wherein the total resource efficiency of the network is determined when the central controller determines whether channel interference occurs between APs near the centralized AP based on the RSSI of the AP near the centralized AP and an adjacent channel power leakage ratio and determines the total resource efficiency of the network based on whether channel interference occurs between the APs near the centralized AP.

16. A non-transitory computer-readable storage medium having stored therein a program for causing a terminal to perform operations of:

receiving a beacon frame comprising first load information of an accessed access point (AP) per radio channel unit;

determining whether to maintain an accessed radio channel of the accessed AP, based on the first load information;

receiving a beacon frame comprising second load information of an AP near the terminal in case that it is determined not to maintain the accessed radio channel;

determining a radio channel to be accessed based on second load information and channel interference information; and accessing the determined radio channel, wherein the radio channel to be accessed is determined by:

measuring a received signal strength indicator (RSSI) of a signal received from the AP near the terminal;

determining whether channel interference of the AP near the terminal occurs, based on the measured RSSI and an adjacent channel power leakage ratio having a pre-determined value according to a channel distance, obtaining a sum of channel load quantities of channels interfering with the radio channel of the accessed AP in case that the channel interference of the AP near the terminal occurs, obtaining a weight value based on the sum of the channel load quantities and a channel load quantity of the radio channel to be accessed, wherein the weight value is inversely proportional to the sum of the channel load quantities, obtaining an expected value of an average spectral efficiency of the radio channel to be accessed, based on the average spectral efficiency of the radio channel to be accessed, and obtaining a resource efficiency of the radio channel to be accessed based on the weight value and the expected value of the average spectral efficiency.

* * * * *